US012689398B2

(12) United States Patent   (10) Patent No.:   US 12,689,398 B2

Ono et al.   (45) Date of Patent:   Jul. 21, 2026

(54) RADIO-FREQUENCY MODULE

(71) Applicant: Murata Manufacturing Co., Ltd., Nagaokakyo (JP)

(72) Inventors: Mayuka Ono, Nagaokakyo (JP); Motoji Tsuda, Nagaokakyo (JP); Yoshiaki Sukemori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 432 days.

(21) Appl. No.: 18/536,243

(22) Filed: Dec. 12, 2023

(65) Prior Publication Data

US 2024/0204808 A1   Jun. 20, 2024

(30) Foreign Application Priority Data

Dec. 14, 2022   (JP) ................................. 2022-199666

(51) Int. Cl.
H04B 1/04      (2006.01)
H04B 1/00      (2006.01)

(52) U.S. Cl.
CPC ............... H04B 1/04 (2013.01); H04B 1/006 (2013.01); H04B 2001/0408 (2013.01)

(58) Field of Classification Search
CPC ... H04B 1/04; H04B 1/006; H04B 2001/0408
See application file for complete search history.

(56) References Cited

U.S. PATENT DOCUMENTS

| | | | | |
|---|---|---|---|---|
| 11,304,337 | B2 * | 4/2022 | Lee ......................... | H05K 7/205 |
| 11,441,953 | B2 * | 9/2022 | Hosotani ................... | G01K 1/14 |
| 2004/0042180 | A1 * | 3/2004 | Yamaguchi .......... | H05K 1/0206 |
| | | | | 361/720 |
| 2018/0191326 | A1 * | 7/2018 | Liu ...................... | H01F 27/2804 |
| 2020/0168566 | A1 * | 5/2020 | Tsai ...................... | H10W 42/20 |
| 2022/0199549 | A1 * | 6/2022 | Min ...................... | H10W 42/20 |

FOREIGN PATENT DOCUMENTS

JP        2008034778 A   *   2/2008   .......... H10W 42/276

* cited by examiner

*Primary Examiner* — Lewis G West

(74) *Attorney, Agent, or Firm* — XSENSUS LLP

(57)   ABSTRACT

A radio-frequency module includes: a module substrate; multiple external connection terminals that are arranged on a main surface of the module substrate; an integrated circuit that is arranged on a main surface of the module substrate; a shield layer that is arranged above the main surface of the integrated circuit; and a metal member that is arranged between the main surface of the integrated circuit and the shield layer. The integrated circuit includes transistors arranged on the main surface and constituting a power amplifier and via conductors connecting the transistors to the metal member. The metal member at least partially overlaps the via conductors and at least partially overlaps the shield layer in a plan view of the module substrate.

20 Claims, 13 Drawing Sheets

RADIO-FREQUENCY MODULE

CROSS-REFERENCE TO RELATED APPLICATION

This application claims priority to Japanese Patent Application No. JP 2022-199666 filed on Dec. 14, 2022. The entire contents of the above-identified application, including the specification, drawings and claims, are incorporated herein by reference in their entirety.

BACKGROUND OF THE DISCLOSURE

1. Field of the Disclosure

The present disclosure relates to a radio-frequency module.

2. Description of the Related Art

In the 3rd Generation Partnership Project (3GPP) (registered trademark), standardization for power classes allowing higher maximum output power than before (such as power classes 1, 1.5, and 2) is being advanced in mobile communication systems. For radio-frequency modules corresponding to such power classes, the output power increases, and accordingly the heat generation of the power amplifier also increases.

Japanese Unexamined Patent Application Publication No. 2008-34778 discloses a heat dissipation structure for a power amplifier which is arranged on the upper surface of a module substrate (that is, a first main surface on the opposite side from a second main surface where multiple external connection terminals are arranged).

SUMMARY OF THE DISCLOSURE

However, in the above-mentioned related art, there may be cases where the heat dissipation of the power amplifier is insufficient.

Therefore, the present disclosure provides a radio-frequency module that allows for an improvement in the heat dissipation of a power amplifier arranged on the upper surface of a module substrate.

A radio-frequency module according to an aspect of the present disclosure includes: a module substrate that includes a first main surface and a second main surface that are opposite to each other; multiple external connection terminals that are arranged on the second main surface of the module substrate; a first integrated circuit that is arranged on the first main surface of the module substrate and includes a third main surface facing the first main surface and a fourth main surface opposite to the third main surface; a shield layer that is arranged above the fourth main surface of the first integrated circuit; and a first metal member that is arranged between the fourth main surface of the first integrated circuit and the shield layer. The first integrated circuit includes a first transistor arranged on the third main surface and constituting a first power amplifier and at least one via conductor connecting the first transistor to the first metal member. The first metal member at least partially overlaps the at least one via conductor and at least partially overlaps the shield layer in a plan view of the module substrate.

A radio-frequency module according to an aspect of the present disclosure allows for an improvement in the heat dissipation of a power amplifier arranged on the upper surface of a module substrate.

DESCRIPTION OF THE PREFERRED EMBODIMENTS

Figure 1:
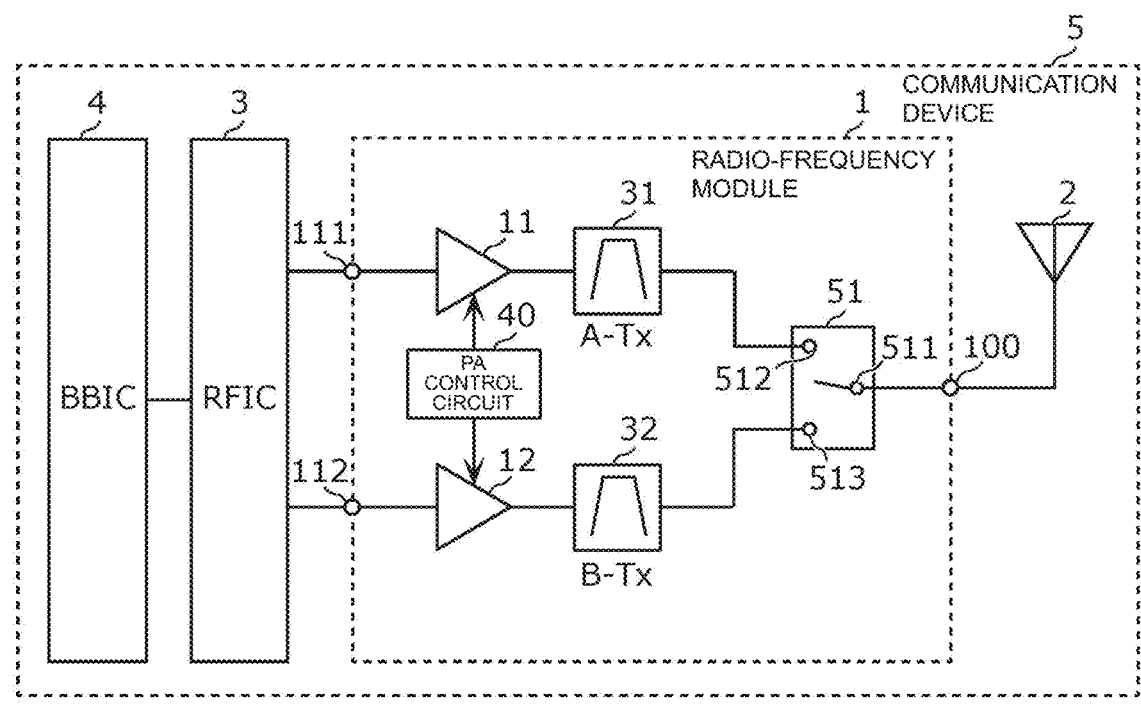
FIG. 1 is a circuit configuration diagram of a communication device according to Embodiment 1.

Hereinafter, embodiments of the present disclosure will be described in detail with reference to the drawings. Note that the embodiments described below are all general or specific examples. Numerical values, shapes, materials, constitutional elements, arrangements of the constitutional elements, connection forms, and the like shown in the following embodiments are examples, and are not intended to limit the present disclosure.

Note that the drawings are schematic drawings in which exaggerations, omissions, or ratio adjustments are made as appropriate to illustrate the present disclosure. They are not necessarily drawn precisely and may differ from the actual shapes, positional relationships, and ratios. In the drawings, identical reference numerals are assigned to substantially identical components, and descriptions that would be redundant may be omitted or simplified.

In the following drawings, the x-axis and the y-axis are axes orthogonal to each other on a plane parallel to a main surface of a module substrate. Specifically, assuming the module substrate is rectangular in plan view, the x-axis is parallel to a first side of the module substrate, and the y-axis is parallel to a second side orthogonal to the first side of the module substrate. Also, the z-axis is an axis perpendicular to the main surface of the module substrate, with its positive direction indicating upward and its negative direction indicating downward.

In the circuit configuration of the present disclosure, "connected" includes not only being directly connected using a connection terminal and/or a wiring conductor, but also being electrically connected via another circuit element. "Directly connected" means being directly connected using a connection terminal and/or a wiring conductor without any other circuit element interposed therebetween. Assuming "C is connected between A and B," it means that C is between A and B and connected to both A and B, and more specifically, one end of C is connected to A, and the other end of C is connected to B.

In the component arrangement of the present disclosure, "a component is arranged on a substrate" includes a component being arranged on a main surface of the substrate, and a component being arranged inside the substrate. "A component is arranged on a main surface of the substrate" includes, in addition to the component being in contact with and arranged on the main surface of the substrate, a situation where the component is arranged above the main surface without contact with the main surface (for example, the component is stacked on another component that is in contact with and arranged on the main surface). Also, "a component is arranged on a main surface of the substrate" may include a component being arranged in a recess formed in the main surface. "A component is arranged inside the substrate" includes, in addition to a component being encapsulated within the module substrate, a situation where the entirety of the component is arranged between both main surfaces of the substrate but a portion of the component is not covered by the substrate, and a situation where only a portion of the component is arranged inside the substrate.

In the component arrangement of the present disclosure, "plan view of the module substrate" refers to viewing an object orthographically projected onto the xy-plane from the positive side of the z-axis. "A at least partially overlaps B in plan view" means that at least a portion of the region of A, which has been orthographically projected onto the xy-plane, overlaps with at least a portion of the region of B, which has also been orthographically projected onto the xy-plane. Furthermore, "A is arranged between B and C" means that at least one of multiple line segments connecting any point within B and any point within C passes through A.

In the component arrangement of the present disclosure, "A is arranged adjacent to B" signifies that A and B are arranged in proximity, and more specifically means that no other circuit components exist in the space facing B from A. Put another way, "A is arranged adjacent to B" means that none of multiple line segments drawn from any point on the surface of A facing B to B in the direction normal to that surface passes through a circuit component other than A and B. Here, "circuit component" refers to components that include active elements and/or passive elements. Hence, circuit components include active components such as transistors or diodes, and passive components such as inductors, transformers, capacitors, or resistors, but do not include electromechanical components such as terminals, connectors, or wiring.

In the present disclosure, "terminal" refers to a point where a conductor within an element terminates. Note that, assuming the impedance between elements is sufficiently low, a terminal is not only interpreted as a single point, but can also be any point on a conductor between elements or the entire conductor itself.

Furthermore, terms that indicate the relationship between elements, such as "parallel" and "perpendicular", terms that describe the shape of an element, such as "rectangular", and numerical ranges not only signify strict definitions but also include substantially equivalent ranges, which may include a certain degree of error, for example, approximately a few percent.

Embodiment 1

Embodiment 1 will be described. A communication device 5, according to the present embodiment, functions as user equipment (UE) in a cellular network and is typically a mobile phone, a smartphone, a tablet computer, a wearable device, or the like. Note that the communication device 5 may be an internet of things (IOT) sensor device, a medical/healthcare device, an automobile, an unmanned aerial vehicle (UAV, commonly known as a drone), or an automated guided vehicle (AGV). Additionally, the communication device 5 may also function as a base station (BS) in a cellular network.

The circuit configuration of the communication device 5 and a radio-frequency module 1 according to the present embodiment will be described with reference to FIG. 1. FIG. 1 is a circuit configuration diagram of the communication device 5 according to the present embodiment.

Note that FIG. 1 shows an illustrative circuit configuration of the communication device 5 and the radio-frequency module 1, and the communication device 5 and the radio-frequency module 1 can be implemented using any of a variety of circuit implementations and circuit technologies. Therefore, the description of the communication device 5 and the radio-frequency module 1 provided below should not be interpreted in a limiting sense.

1.1 Circuit Configuration of Communication Device 5

First, the circuit configuration of the communication device 5 according to the present embodiment will be described with reference to FIG. 1. The communication device 5 includes the radio-frequency module 1, an antenna 2, a radio frequency integrated circuit (RFIC) 3, and a baseband integrated circuit (BBIC) 4.

The radio-frequency module 1 transmits radio-frequency signals between the antenna 2 and the RFIC 3. The circuit configuration of the radio-frequency module 1 will be described later.

The antenna 2 is connected to an antenna connection terminal 100 of the radio-frequency module 1. The antenna 2 receives radio-frequency signals from the radio-frequency module 1 and outputs them to the outside of the communication device 5. In addition, the antenna 2 receives radio-frequency signals from outside the communication device 5 and outputs them to the radio-frequency module 1. Note that the antenna 2 does not necessarily have to be included in the communication device 5. Moreover, in addition to the antenna 2, the communication device 5 may also include one or more antennas.

The RFIC 3 is an example of a signal processing circuit that processes radio-frequency signals. Specifically, the RFIC 3 processes a transmission signal inputted from the BBIC 4 by up-conversion or the like and outputs the radio-frequency transmission signal generated by this signal processing to the radio-frequency module 1. Furthermore, the RFIC 3 processes a radio-frequency reception signal inputted via the reception path of the radio-frequency module 1 by down-conversion or the like and outputs the reception signal generated by this signal processing to the BBIC 4. The RFIC 3 may also include a control unit that controls, for example, a switch and power amplifiers of the radio-frequency module 1. All or part of the control unit may be provided outside of the RFIC 3, and for example, it may be included in the BBIC 4 or the radio-frequency module 1.

The BBIC 4 is a baseband signal processing circuit that processes signals using an intermediate frequency band lower than the radio-frequency signals transmitted by the radio-frequency module 1. Examples of signals processed by the BBIC 4 include image signals for image display, and/or audio signals used for communication via a speaker. Note that the BBIC 4 does not necessarily have to be included in the communication device 5.

1.2 Circuit Configuration of Radio-Frequency Module 1

Next, the circuit configuration of the radio-frequency module 1, according to the present embodiment, will be described with reference to FIG. 1. The radio-frequency module 1 includes power amplifiers (PAs) 11 and 12, filters 31 and 32, a PA control circuit 40, a switch 51, an antenna connection terminal 100, and radio-frequency input terminals 111 and 112.

The antenna connection terminal 100 is an example of an external connection terminal of the radio-frequency module 1, and is connected to the antenna 2 outside the radio-frequency module 1. Additionally, the antenna connection terminal 100 is connected to the switch 51 inside the radio-frequency module 1. As a result, the radio-frequency module 1 can feed transmission signals to the antenna 2 via the antenna connection terminal 100.

Each of the radio-frequency input terminals 111 and 112 is an example of an external connection terminal of the radio-frequency module 1, and is connected to the RFIC 3 outside the radio-frequency module 1. Additionally, the radio-frequency input terminals 111 and 112 are connected inside the radio-frequency module 1 to the power amplifiers 11 and 12, respectively. Thus, the radio-frequency input terminal 111 can receive transmission signals of band A from the RFIC 3 and feed them to the power amplifier 11. Similarly, the radio-frequency input terminal 112 can receive transmission signals of band B from the RFIC 3 and feed them to the power amplifier 12.

Each of the bands A and B is a frequency band for a communication system built using radio access technology (RAT), predefined by, for example, standardization bodies such as the 3rd Generation Partnership Project (3GPP) (registered trademark) and the Institute of Electrical and Electronics Engineers (IEEE). Examples of communication systems include 5th generation new radio (5G NR) systems, long term evolution (LTE) systems, and wireless local area network (WLAN) systems, among others.

The transmission band refers to the frequency band used for transmission in the communication device 5. For example, assuming the band A is a frequency division duplex (FDD) band, a different frequency band from the reception band is used as the transmission band within the band A. On the other hand, assuming the band A is a time division duplex (TDD) band, the same frequency band as the reception band is used as the transmission band within the band A. Particularly assuming the communication device 5 functions as UE, the uplink operation band is used as the transmission band in the FDD band. Conversely, assuming the communication device 5 functions as a BS, the downlink operation band is used as the transmission band in the FDD band.

The power amplifier 11 is an example of a first power amplifier. The input terminal of the power amplifier 11 is connected to the radio-frequency input terminal 111. The output terminal of the power amplifier 11 is connected to the filter 31. The power amplifier 11 can amplify the transmission signal of the band A received via the radio-frequency input terminal 111 using power fed from a power source (not shown).

The power amplifier 12 is an example of a second power amplifier. The input terminal of the power amplifier 12 is connected to the radio-frequency input terminal 112. The output terminal of the power amplifier 12 is connected to the filter 32. The power amplifier 12 can amplify the transmission signal of the band B received via the radio-frequency input terminal 112 using power fed from a power source (not shown).

The filter 31 is a band pass filter with a pass band that includes the transmission band (A-Tx) of the band A. The filter 31 is connected between the power amplifier 11 and the switch 51.

The filter 32 is a band pass filter with a pass band that includes the transmission band (B-Tx) of the band B, which is different from the band A. The filter 32 is connected between the power amplifier 12 and the switch 51.

The PA control circuit 40 can control the power amplifiers 11 and 12. For example, the PA control circuit 40 can control the bias circuits of the power amplifiers 11 and 12 based on a digital control signal from the RFIC 3.

The switch 51 is connected between the antenna connection terminal 100 and the filters 31 and 32. Specifically, the switch 51 includes a terminal 511 connected to the antenna connection terminal 100, a terminal 512 connected to the filter 31, and a terminal 513 connected to the filter 32.

In such a connection configuration, the switch 51 can, for example, exclusively connect the terminal 511 to the terminals 512 and 513 based on a control signal from the RFIC 3. The switch 51 may be a single-pole double-throw (SPDT) type switch circuit. Note that the switch 51 may be capable of simultaneously connecting the terminal 511 to the terminals 512 and 513.

1.3 Circuit Configuration of Power Amplifiers 11 and 12

Figure 2A:
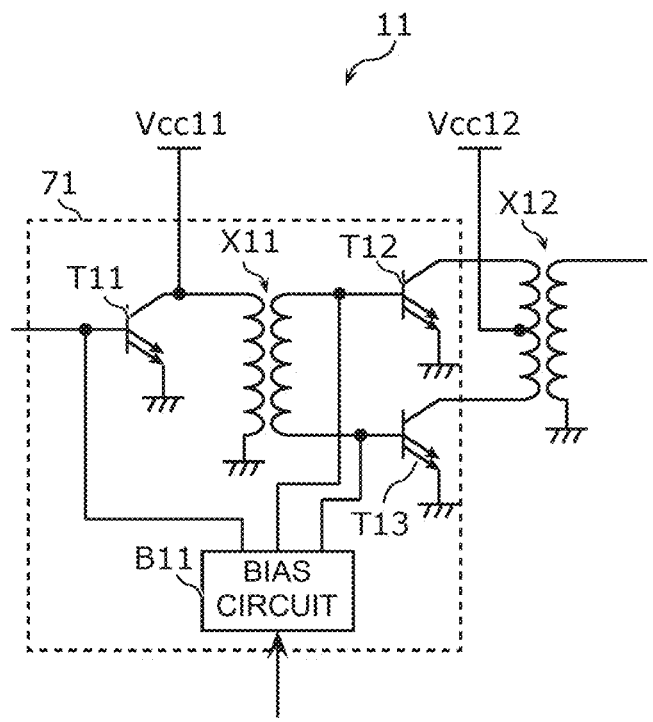
FIG. 2A is a circuit configuration diagram of a power amplifier according to Embodiment 1.
Figure 2B:
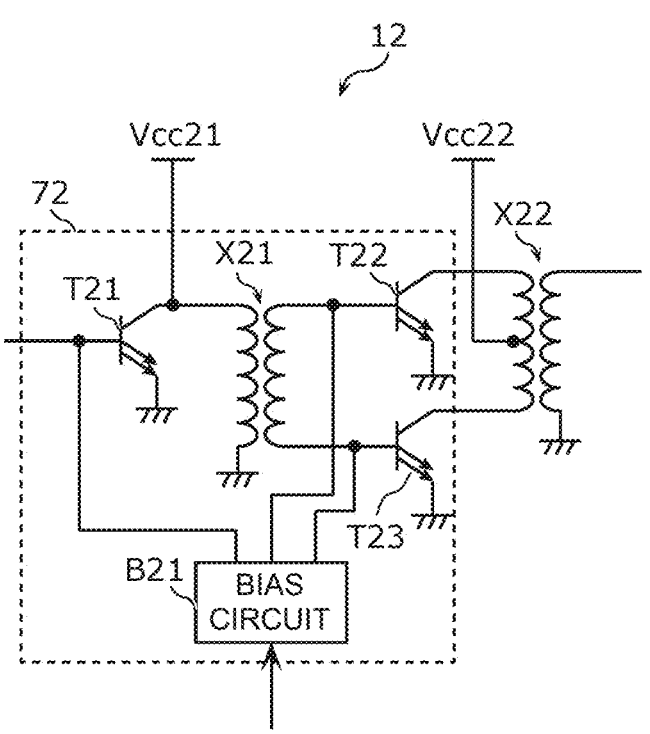
FIG. 2B is a circuit configuration diagram of a power amplifier according to Embodiment 1.

Next, the circuit configuration of the power amplifiers 11 and 12 according to the present embodiment will be described with reference to FIGS. 2A and 2B. FIGS. 2A and 2B are circuit configuration diagrams of the power amplifiers 11 and 12 according to the present embodiment.

Note that FIGS. 2A and 2B show illustrative circuit configurations of the power amplifiers 11 and 12, and the power amplifiers 11 and 12 can be implemented using any of a variety of circuit implementations and circuit technologies. Therefore, the description of the power amplifiers 11 and 12 provided below should not be interpreted in a limiting sense.

As shown in FIG. 2A, the power amplifier 11 includes transistors T11 to T13 (examples of a first transistor), transformers X11 and X12, and a bias circuit B11.

The transistor T11 functions as the input stage (also referred to as the drive stage) of a multistage amplifier. The base terminal of the transistor T11 is connected to the input terminal of the power amplifier 11 and to the bias circuit B11. The collector terminal of the transistor T11 is connected to the primary coil of the transformer X11. In addition, a power supply voltage Vcc11 is fed to the collector terminal of the transistor T1*l*. The emitter terminal of the transistor T11 is connected to the ground.

The transistor T12, together with the transistor T13, functions as the output stage (also referred to as the power stage) of a multistage amplifier and also functions as a differential amplifier. The base terminal of the transistor T12 is connected to one end of the secondary coil of the transformer X11 and to the bias circuit B11. The collector terminal of the transistor T12 is connected to one end of primary coil of the transformer X12. The emitter terminal of the transistor T12 is connected to the ground.

The transistor T13, together with the transistor T12, functions as the output stage of a multistage amplifier and also functions as a differential amplifier. The base terminal of the transistor T13 is connected to the other end of the secondary coil of the transformer X11 and to the bias circuit B11. The collector terminal of the transistor T13 is connected to the other end of the primary coil of the transformer X12. The emitter terminal of the transistor T13 is connected to the ground.

The transformer X11 includes a primary coil and a secondary coil configured for magnetic field coupling with each other, and is configured to convert an input signal (single-ended signal) into a differential signal. One end of the primary coil of the transformer X11 is connected to the collector terminal of the transistor T1*l*. The other end of the primary coil of the transformer X11 is connected to the ground. One end of the secondary coil of the transformer X11 is connected to the base terminal of the transistor T12. The other end of the secondary coil of the transformer X11 is connected to the base terminal of the transistor T13.

The transformer X12 includes a primary coil and a secondary coil configured for magnetic field coupling with each other, and is configured to convert a differential signal into an output signal (single-ended signal). One end of the primary coil of the transformer X12 is connected to the collector terminal of the transistor T12. The other end of the primary coil of the transformer X12 is connected to the collector terminal of the transistor T13. The midpoint of the primary coil of the transformer X12 is fed with a power supply voltage Vcc12. One end of the secondary coil of the transformer X12 is connected to the output terminal of the power amplifier 11. The other end of the secondary coil of the transformer X12 is connected to the ground.

The bias circuit B11 is connected to the base terminals of the transistors T11 to T13. The bias circuit B11 is configured to feed a bias signal to the base terminals of the transistors T11 to T13.

In the present embodiment, the transistors T11 to T13, the transformer X11, and the bias circuit B11 are included in a single integrated circuit 71, and the transformer X12 is not included in the integrated circuit 71.

As illustrated in FIG. 2B, the power amplifier 12 has a configuration similar to that of the power amplifier 11, and includes transistors T21 to T23, transformers X21 and X22, and a bias circuit B21. Note that the transistors T21 to T23 (examples of a second transistor), the transformers X21 and X22, and the bias circuit B21 are similar to the transistors T11 to T13, the transformers X11 and X12, and the bias circuit B11, respectively; therefore, their descriptions are omitted.

Note that the circuit configurations of the power amplifiers 11 and 12 are examples, and are not limited to the configurations shown in FIGS. 2A and 2B. For example, the power amplifier 11 and/or the power amplifier 12 may include a capacitor and/or an inductor. For example, a choke inductor and/or a bypass capacitor (sometimes referred to as a decoupling capacitor) may be connected to the power supply voltage path in the power amplifier 11 and/or the power amplifier 12, and a coupling capacitor may be connected to the radio-frequency signal path.

Furthermore, the power amplifiers 11 and 12 are not limited to differential amplifiers. For example, the power amplifier 11 and/or the power amplifier 12 can be a Doherty amplifier. In this case, a phase shifting circuit (for example, a ¼ wavelength transmission line) may be connected between the transistor T12 (or T22) or T13 (or T23) and the transformer X12 (or X22). In this case, the transistors T12 (or T22) and T13 (or T23) function as a carrier amplifier and a peak amplifier, respectively. Additionally, a power divider (for example, a Wilkinson circuit) can be used in place of the transformer X11 (or X21), and a combiner (for example, a Wilkinson circuit) can be used in place of the transformer X12 (or X22).

For example, the power amplifier 11 and/or the power amplifier 12 can be a single-ended amplifier that directly amplifies single-ended signals. In this case, the power amplifier 11 and/or the power amplifier 12 does not necessarily have to include a transformer.

Additionally, the power amplifiers 11 and 12 are not limited to multistage amplifiers. In this case, the power amplifier 11 does not necessarily have to include the transistor T11, and the power amplifier 12 does not necessarily have to include the transistor T21. Furthermore, the power amplifier 11 does not necessarily have to include the transistor T13 and the transformers X11 and X12 in addition to the transistor T11, and the power amplifier 12 does not necessarily have to include the transistor T23 and the transformers X21 and X22 in addition to the transistor T21.

Also, the numbers of stages in the power amplifiers 11 and 12 are not limited to two, and for example, can be three or more. In this case, the power amplifier 11 may include one or more transistors between the transistor T11 and the transformer X11, and the power amplifier 12 may include one or more transistors between the transistor T21 and the transformer X21.

1.4 Implementation Example of Radio-Frequency Module 1

Figure 3:
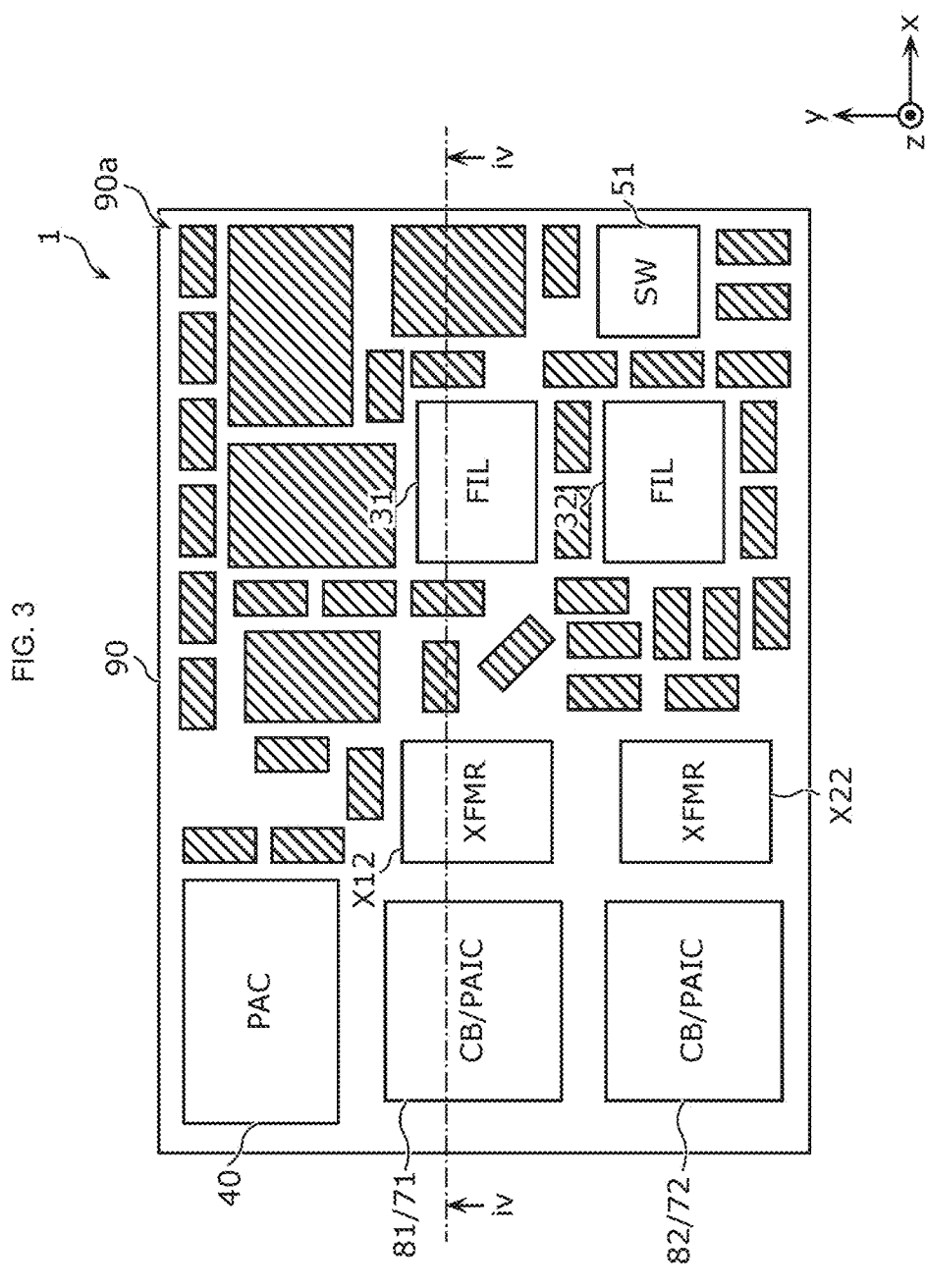
FIG. 3 is a plan view of a radio-frequency module according to Embodiment 1.
Figure 4:
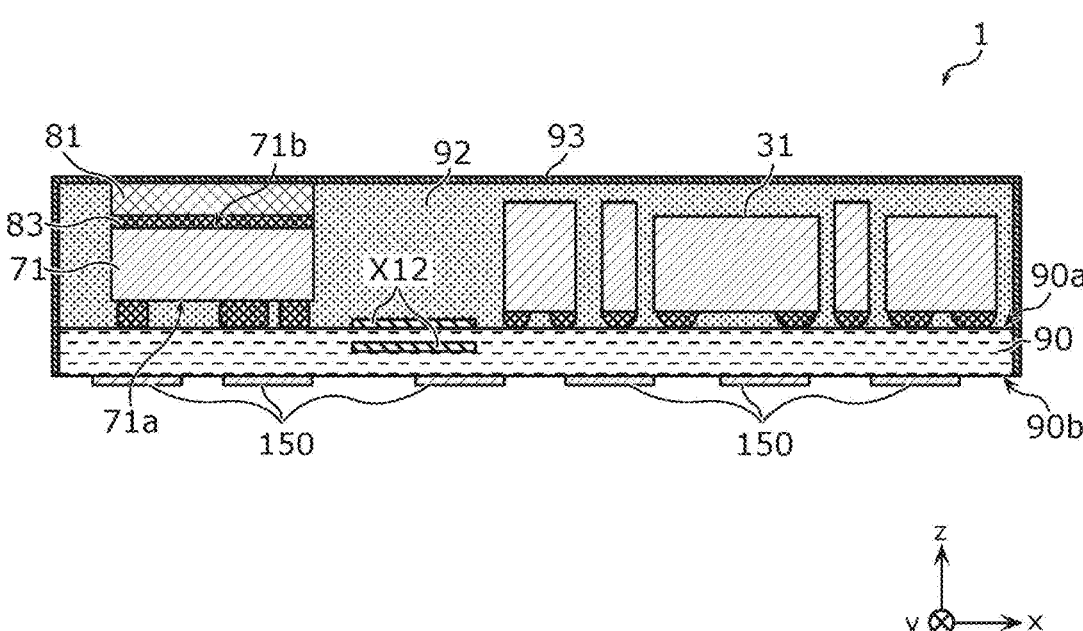
FIG. 4 is a cross-sectional view of the radio-frequency module according to Embodiment 1.

Next, an implementation example of the radio-frequency module 1 with the circuit configuration as described above will be described with reference to FIGS. 3 and 4. FIG. 3 is a plan view of the radio-frequency module 1 according to the present embodiment. FIG. 4 is a cross-sectional view of the radio-frequency module 1 according to the present embodiment. The cross-section of the radio-frequency module 1 in FIG. 4 corresponds to the cross-section along line iv-iv in FIG. 3.

In FIG. 3, characters representing each component are provided to aid understanding of the arrangement of the components, but in practice, it is not necessary to label each component with these characters. Also, in FIG. 3, the depiction of a resin member 92 covering multiple circuit components and a shield layer 93 covering the surface of the resin member 92 is omitted, and hatching is applied to optional circuit components that are not essential to the present disclosure.

Note that FIGS. 3 and 4 show an illustrative configuration of the radio-frequency module 1, and the radio-frequency module 1 can be implemented using any of a variety of circuit implementations and circuit technologies. Therefore, the description of the radio-frequency module 1 provided below should not be interpreted in a limiting sense.

The radio-frequency module 1 includes, in addition to multiple circuit components shown in FIGS. 1, 2A, and 2B, metal members 81 and 82, a module substrate 90, a resin member 92, a shield layer 93, and multiple external connection terminals 150.

The module substrate 90 has main surfaces 90a and 90b that are opposite to each other. The main surface 90a is an example of a first main surface, which may also be referred to as an upper surface or front surface. The main surface 90b is an example of a second main surface, which may also be referred to as a lower surface or back surface. Wiring lines (not shown) and via conductors (not shown), for example, are formed within the module substrate 90 and on the main surface 90a. Note that in FIG. 3, the module substrate 90 is shown to have a rectangular shape in plan view, but it is not limited to this shape.

Examples of the module substrate 90 include, but are not limited to, a substrate with a laminate structure of multiple dielectric layers, such as a low temperature co-fired ceramic (LTCC) substrate or a high temperature co-fired ceramic (HTCC) substrate, a component-embedded substrate, a substrate with a redistribution layer (RDL), and a printed circuit board.

Each of the filters 31 and 32 (FIL) is arranged on the main surface 90a of the module substrate 90. The filters 31 and 32 may be a surface acoustic wave (SAW) filter, a bulk acoustic wave (BAW) filter, an LC resonance filter or a dielectric resonance filter, or any combination of these, and further, it is not limited to these.

The PA control circuit 40 (PAC) is arranged on the main surface 90a of the module substrate 90. The PA control circuit 40 is implemented as a semiconductor integrated circuit.

The switch 51 (SW) is arranged on the main surface 90a of the module substrate 90. The switch 51 can employ a semiconductor integrated circuit including a field effect transistor (FET). Here, for the semiconductor material, silicon (Si) can be used, for example, but is not limited to this. Materials such as gallium nitride (GaN) may also be used.

Integrated circuits 71 and 72 (PAIC) are examples of a first integrated circuit and a second integrated circuit, respectively, and are arranged on the main surface 90a of the module substrate 90. Note that details about the integrated circuit 71 will be described later using FIGS. 5 and 6.

The metal members 81 and 82 (CB) are examples of a first metal member and are arranged on the integrated circuits 71 and 72, respectively. Details about the metal member 81 will be described later using FIGS. 5 and 6.

The transformers X12 and X22 (XFMR) are arranged on the main surface 90a of the module substrate 90. Specifically, at least a portion of one of the primary coil and secondary coil of the transformer X12 is formed on the main surface 90a of the module substrate 90 in a wiring pattern. The other of the primary coil and secondary coil of the transformer X12 is formed in a wiring pattern inside the module substrate 90. The primary coil and secondary coil of the transformer X22 are formed in the same way as the transformer X12. Note that the transformer X12 and/or the transformer X22 can be formed in a wiring pattern solely within the module substrate 90. That is, both the primary coil and secondary coil of the transformer X12 and/or the transformer X22 can be formed inside the module substrate 90. Additionally, the transformers X12 and X22 do not necessarily have to be formed in a wiring pattern, and for example, they can be surface mount devices (SMDs).

The resin member 92 covers at least a portion of the main surface 90a of the module substrate 90 and the circuit components on the main surface 90a. Note that the resin member 92 does not cover at least a portion of the metal members 81 and 82, and at least a portion of the metal members 81 and 82 is exposed from the resin member 92. Examples of the material of the resin member 92 include, but are not limited to, epoxy resin. The resin member 92 has a function to ensure the reliability such as mechanical strength and moisture resistance of the circuit components on the main surface 90a. Note that the resin member 92 does not necessarily have to be included in the radio-frequency module 1.

The shield layer 93 is a metal thin film formed, for example, by the sputtering method. As shown in FIG. 4, the shield layer 93 covers the surfaces (upper surface and side surfaces) of the resin member 92. In addition, the shield layer 93 is bonded to the metal members 81 and 82 and covers the surfaces of the metal members 81 and 82. The shield layer 93 is connected to the ground and can suppress entry of external noise into the radio-frequency module 1 and interference of noise generated in the radio-frequency module 1 with other modules or other equipment.

The multiple external connection terminals 150 are arranged on the main surface 90b of the module substrate 90, and function as ground terminals in addition to the antenna connection terminal 100 and the radio-frequency input terminals 111 and 112 shown in FIG. 1. The multiple external connection terminals 150 are electrically connected to, for example, input/output terminals and/or ground terminals (not shown) on a mother substrate arranged in the negative z-axis direction of the radio-frequency module 1. As the multiple external connection terminals 150, copper electrodes or solder electrodes can be used, but they are not limited to these.

In the present embodiment, the filters 31 and 32, the PA control circuit 40, and the switch 51 are arranged on the main surface 90a of the module substrate 90, but are not limited to this. For example, the filter 31 or 32, the PA control circuit 40, the switch 51, the transformer X12 or X22, or any combination of these may be arranged on the main surface 90b of the module substrate 90.

1.5 Implementation Example of Integrated Circuit 71

Next, an implementation example of the integrated circuit 71 will be described with reference to FIGS. 5 and 6. Note that the implementation example of the integrated circuit 72 is similar to that of integrated circuit 71; therefore, the illustration and description are omitted.

Figure 5:
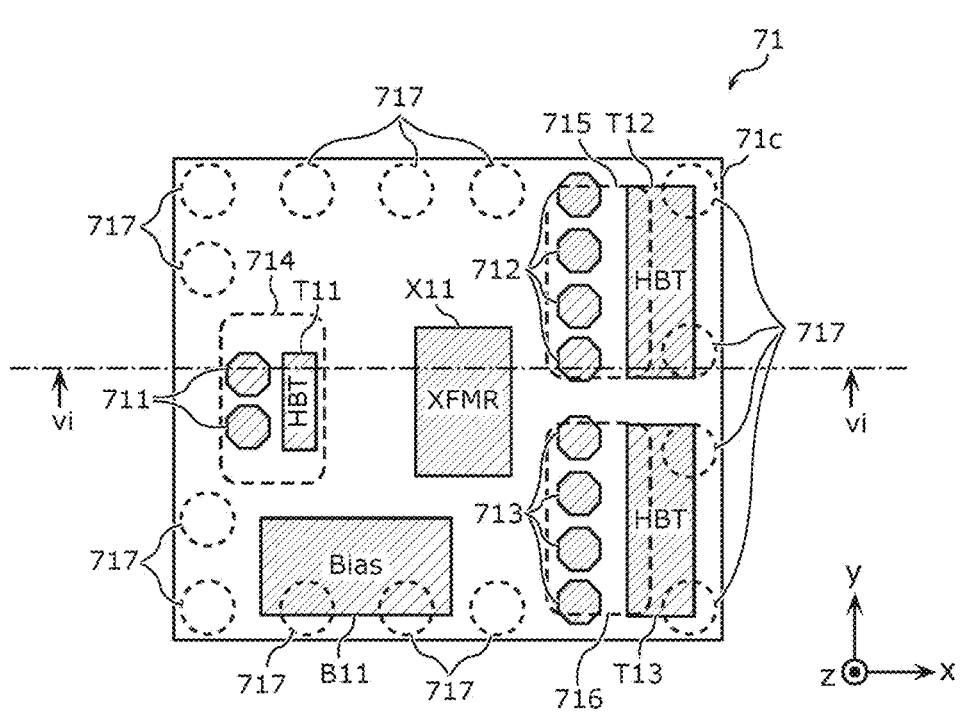
FIG. 5 is a transparent plan view of an integrated circuit according to Embodiment 1.

FIG. 5 is a transparent plan view of the integrated circuit 71 according to the present embodiment. FIG. 6 is a cross-sectional view of the integrated circuit 71 and the metal member 81 according to the present embodiment. The cross-section of the integrated circuit 71 and the metal member 81 in FIG. 6 corresponds to the cross-section along line vi-vi in FIG. 5.

In FIG. 5, characters representing each element are provided to aid understanding of the arrangement of the components, but in practice, it is not necessary to label each element with these characters. Also, in FIG. 5, among the elements on a main surface 71a within the integrated circuit 71, the elements positioned on the positive side of the z-axis are represented by hatched blocks, and the elements positioned on the negative side of the z-axis are represented by dashed blocks.

Figure 6:
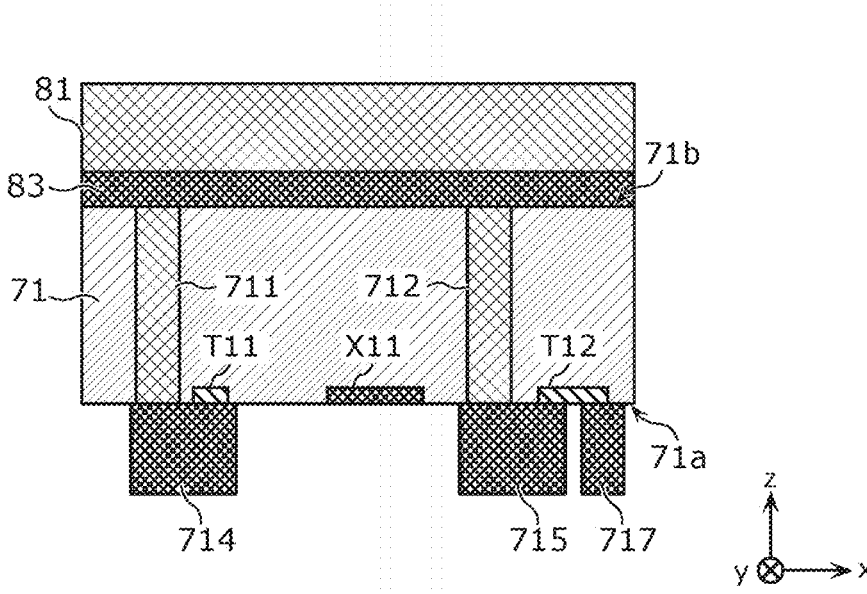
FIG. 6 is a cross-sectional view of the integrated circuit and a metal member according to Embodiment 1.

Note that FIGS. 5 and 6 show an illustrative internal configuration of the integrated circuit 71, and the integrated circuit 71 can be implemented using any of a variety of circuit implementations and circuit technologies. Therefore, the description of the integrated circuit 71 provided below should not be interpreted in a limiting sense.

As shown in FIG. 5, the integrated circuit 71 has at least one side 71c (an example of a first side) in a plan view of the module substrate 90. Note that in FIG. 5, the shape of the integrated circuit 71 is rectangular, but it is not limited to this. Moreover, as shown in FIG. 6, the integrated circuit 71 has main surfaces 71a and 71b that are opposite to each other. The main surface 71a is an example of a third main surface, facing the main surface 90a of the module substrate 90. The main surface 71b is an example of a fourth main surface, located on the opposite side from the main surface 71a. The integrated circuit 71 can be manufactured using a semiconductor material. As the semiconductor material, for example, silicon germanium (SiGe) or gallium arsenide (GaAs) can be used, and gallium nitride (GaN) or silicon carbide (SiC) can also be used. SiGe, GaAs or GaN on a silicon substrate may be used. Note that the integrated circuit 71 may include a metal layer, and for example, the main surface 71b can be formed by the metal layer. As the metal layer, a copper-nickel alloy (CuNi) can be used, but it is not limited to this.

The integrated circuit 71 includes transistors T11 to T13 (HBT), a bias circuit B11 (Bias), a transformer X11 (XFMR), via conductors 711 to 713, and bump electrodes 714 to 717.

The transistor T11 is arranged on the main surface 71a and connected to the bump electrode 714. In a plan view of the module substrate 90, the transistor T11 at least partially overlaps the bump electrode 714. Furthermore, the transistor T11 is arranged adjacent to the via conductors 711 and is connected to the via conductors 711.

The transistor T12 is arranged along the side 71c on the main surface 71a and is connected to the bump electrode 715. In a plan view of the module substrate 90, the transistor T12 at least partially overlaps the bump electrode 715. Furthermore, the transistor T12 is arranged adjacent to the via conductors 712 and is connected to the via conductors 712.

The transistor T13 is arranged along the side 71c on the main surface 71a and is connected to the bump electrode 716. In a plan view of the module substrate 90, the transistor T13 at least partially overlaps the bump electrode 716.

Furthermore, the transistor T13 is arranged adjacent to the via conductors 713 and is connected to the via conductors 713.

In the present embodiment, heterojunction bipolar transistors (HBTs) are used as the transistors T11 to T13, but the transistors T11 to T13 are not limited to HBTs. For example, high electron mobility transistors (HEMTs) or metal-semiconductor field effect transistors (MESFETs) can be used as the transistors T11 to T13. In this case, gallium nitride (GaN) or silicon carbide (SiC) can be used as the semiconductor material for the integrated circuit 71.

The via conductors 711 to 713 are conductors arranged in vias that extend through the integrated circuit 71, and connect respective transistors T11 to T13 on the main surface 71a to the metal member 81 on the main surface 71b. Note that in the present embodiment, the via conductors 711 to 713 are arranged in through-vias, but this is not limited to this. For example, instead of the through-vias, two blind vias may be used. In that case, it suffices that the conductor arranged in the blind via on the main surface 71a side and the conductor arranged in the blind via on the main surface 71b side be connected within the integrated circuit 71.

The via conductors 711 are arranged along the transistor T11 and are connected to the transistor T11. Furthermore, the via conductors 711 are connected to the metal member 81.

The via conductors 712 are arranged along the transistor T12 and are connected to the transistor T12. Furthermore, the via conductors 712 are connected to the metal member 81.

The via conductors 713 are arranged along the transistor T13 and are connected to the transistor T13. Furthermore, the via conductors 713 are connected to the metal member 81.

The bump electrodes 714 to 717 are arranged on the main surface 71a of the integrated circuit 71, and are connected to the main surface 90a of the module substrate 90. The bump electrodes 714 to 716 primarily serve as electrodes for heat dissipation and are connected to the module substrate 90 outside the integrated circuit 71. The bump electrodes 717 primarily serve as electrodes for input or output of radio-frequency signals, or for ground connection, and are connected to the module substrate 90 outside the integrated circuit 71.

The bump electrode 714 is connected to the transistor T11 and at least partially overlaps the transistor T11 in a plan view of the module substrate 90. Furthermore, the bump electrode 714 is connected to the via conductors 711 and at least partially overlaps the via conductors 711 in a plan view of the module substrate 90. Note that the bump electrode 714 does not necessarily have to overlap the via conductors 711.

The bump electrode 715 is connected to the transistor T12 and at least partially overlaps the transistor T12 in a plan view of the module substrate 90. Furthermore, the bump electrode 715 is connected to the via conductors 712 and at least partially overlaps the via conductors 712 in a plan view of the module substrate 90. Note that the bump electrode 715 does not necessarily have to overlap the via conductors 712. In addition, the bump electrode 715 may be combined with the bump electrode 714 into one unit.

The bump electrode 716 is connected to the transistor T13 and at least partially overlaps the transistor T13 in a plan view of the module substrate 90. Furthermore, the bump electrode 716 is connected to the via conductors 713 and at least partially overlaps the via conductors 713 in a plan view of the module substrate 90. Note that the bump electrode 716 does not necessarily have to overlap the via conductors 713.

The metal member 81 is made of, for example, copper, gold, or brass, and is arranged between the main surface 71*b* of the integrated circuit 71 and the shield layer 93. In the present embodiment, the metal member 81 is a metal plate, the lower surface of the metal member 81 is connected to the main surface 71*b* with the solder layer 83 interposed therebetween, and the upper surface of the metal member 81 is connected to the shield layer 93. Note that the shape of the metal member 81 is not limited to a plate shape. For example, the shape of the metal member 81 can be block-shaped or rod-shaped.

In a plan view of the module substrate 90, the metal member 81 at least partially overlaps each of the via conductors 711 to 713 and also at least partially overlaps the shield layer 93. In the present embodiment, the metal member 81 is connected to the main surface 71*b* and the via conductors 711 to 713 with the solder layer 83 interposed therebetween.

The solder layer 83 is an example of a bonding layer and is designed to bond the metal member 81 to the integrated circuit 71. The solder layer 83 does not necessarily have to include solder. Also, the solder layer 83 does not necessarily have to be included in the radio-frequency module 1. In this case, the metal member 81 may be directly connected to the main surface 71*b* and the via conductors 711 to 713. Additionally, the metal member 81 is bonded to the shield layer 93. In other words, the metal member 81 is directly connected to the shield layer 93.

With the aforementioned configuration, the heat generated by the transistor T11 is dissipated through the bump electrode 714 and the module substrate 90, as well as the via conductors 711, the solder layer 83, the metal member 81, and the shield layer 93. Furthermore, the heat generated by the transistor T12 is dissipated through the bump electrode 715 and the module substrate 90, as well as the via conductors 712, the solder layer 83, the metal member 81, and the shield layer 93. Moreover, the heat generated by the transistor T13 is dissipated through the bump electrode 716 and the module substrate 90, as well as the via conductors 713, the solder layer 83, the metal member 81, and the shield layer 93.

At this time, the metal member 81, in a plan view of the module substrate 90, at least partially overlaps each of the transistors T11 to T13. Furthermore, the metal member 81, in a plan view of the module substrate 90, at least partially overlaps each of the via conductors 711 to 713. This enables the shortening of the heat dissipation path, improving the heat dissipation efficiency.

1.6 Method of Manufacturing Radio-Frequency Module 1

Next, a method for manufacturing the radio-frequency module 1, as described above, will be explained with reference to FIGS. 7A to 7E. FIGS. 7A to 7E are illustrations showing first to fifth steps of the method for manufacturing the radio-frequency module 1, according to the present embodiment.

Figure 7A:
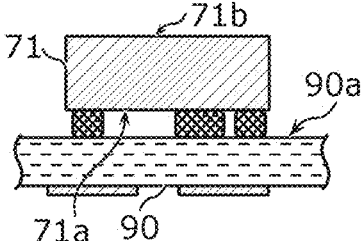
FIG. 7A is an illustration showing a first step of a method of manufacturing the radio-frequency module according to Embodiment 1.
Figure 7B:
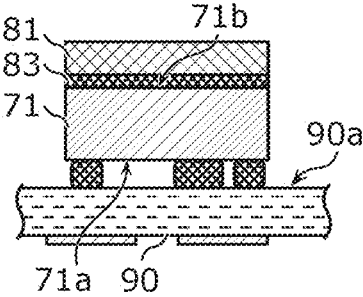
FIG. 7B is an illustration showing a second step of the method of manufacturing the radio-frequency module according to Embodiment 1.
Figure 7C:
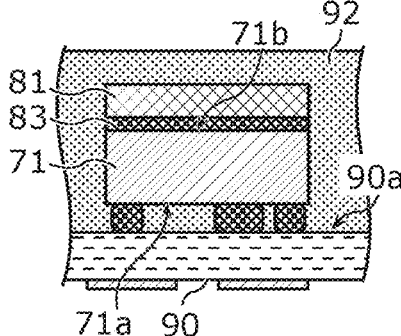
FIG. 7C is an illustration showing a third step of the method of manufacturing the radio-frequency module according to Embodiment 1.
Figure 7D:
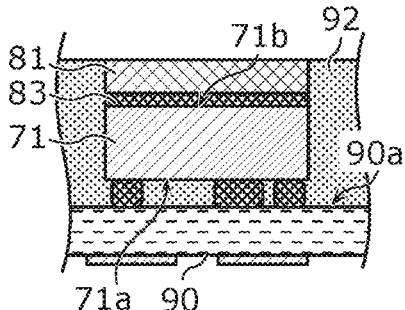
FIG. 7D is an illustration showing a fourth step of the method of manufacturing the radio-frequency module according to Embodiment 1.
Figure 7E:
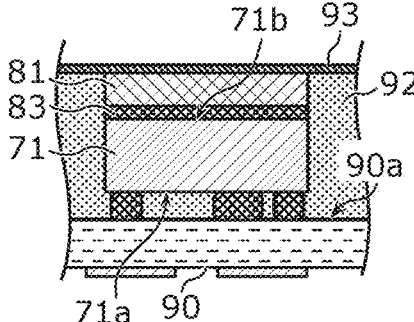
FIG. 7E is an illustration showing a fifth step of the method of manufacturing the radio-frequency module according to Embodiment 1.

Firstly, in the first step, as shown in FIG. 7A, the integrated circuit 71 and the like are mounted on the main surface 90*a* of the module substrate 90. Then, in the second step, as shown in FIG. 7B, solder is transferred onto the integrated circuit 71, and the metal member 81 is arranged on the solder layer 83. After that, reflow and cleaning are performed. Next, in the third step, as shown in FIG. 7C, the resin member 92 is deposited onto the main surface 90*a* of the module substrate 90. At this time, the resin member 92 is also deposited between the integrated circuit 71 and the metal member 81. Then, in the fourth step, as shown in FIG. 7D, the resin member 92 is ground to expose the metal member 81 from the resin member 92. Lastly, in the fifth step, as shown in FIG. 7E, the shield layer 93 is formed on the surface of the metal member 81 and the resin member 92 by the sputtering method.

1.7 Effects and the Like

As described above, the radio-frequency module 1 according to the present embodiment includes: a module substrate 90 that includes main surfaces 90*a* and 90*b* that are opposite to each other; multiple external connection terminals 150 that are arranged on the main surface 90*b* of the module substrate 90; an integrated circuit 71 that is arranged on the main surface 90*a* of the module substrate 90 and includes a main surface 71*a* facing the main surface 90*a* and a main surface 71*b* opposite to the main surface 71*a*; a shield layer 93 that is arranged above the main surface 71*b* of the integrated circuit 71; and a metal member 81 that is arranged between the main surface 71*b* of the integrated circuit 71 and the shield layer 93. The integrated circuit 71 includes a transistor arranged on the main surface 71*a* and constituting a power amplifier 11 (such as the transistor T12) and at least one via conductor connecting the transistor to the metal member 81 (such as the via conductors 712). The metal member 81 at least partially overlaps the at least one via conductor and at least partially overlaps the shield layer 93 in a plan view of the module substrate 90.

According to this, the metal member 81 is arranged between the main surface 71*b* of the integrated circuit 71 and the shield layer 93, which are arranged above the main surface 90*a* of the module substrate 90. Therefore, the heat generated by the integrated circuit 71 can be dissipated from the main surface 71*b* of the integrated circuit 71 to the shield layer 93 via the metal member 81, thus improving the heat dissipation of the integrated circuit 71. In particular, the metal member 81 at least partially overlaps each of the via conductors 712 and the shield layer 93 in a plan view of the module substrate 90. Therefore, it is possible to shorten the path for heat dissipation from the transistor T12 arranged on the main surface 71*a* through the via conductors 712, the metal member 81, and the shield layer 93, and the effect of improving the heat dissipation of the integrated circuit 71 is significant.

For example, the radio-frequency module 1 according to the present embodiment may further include the solder layer 83 as a bonding layer for bonding the metal member 81 to the main surface 71*b* of the integrated circuit 71.

According to this, it is possible to reduce the thermal resistance between the metal member 81 and the main surface 71*b* of the integrated circuit 71, and further improve the heat dissipation of the integrated circuit 71.

For example, in the radio-frequency module 1 according to the present embodiment, the metal member 81 may be bonded to the shield layer 93.

According to this, it is possible to reduce the thermal resistance between the metal member 81 and the shield layer 93, and further improve the heat dissipation of the integrated circuit 71.

For example, in the radio-frequency module 1 according to the present embodiment, the metal member 81 may be made of copper.

According to this, it is possible to use a material with high thermal conductivity for the metal member 81, and enhance the heat dissipation of the integrated circuit 71. Furthermore, the grindability of the metal member 81 is improved, enhancing the degree of bonding with the shield layer 93, and reducing the thermal resistance between the metal member 81 and the shield layer 93. As a result, the heat dissipation of the integrated circuit 71 can be further improved.

For example, the radio-frequency module 1 according to the present embodiment may further include a resin member 92 that covers at least a portion of the main surface 90*a* of the module substrate 90 and at least a portion of the integrated circuit 71, and the shield layer 93 may cover at least a portion of the surface of the resin member 92.

According to this, it is possible to enhance the reliability, such as mechanical strength and moisture resistance, of the integrated circuit 71 and others on the main surface 90*a*.

For example, in the radio-frequency module 1 according to the present embodiment, the integrated circuit 71 may have the side 71*c* in a plan view of the module substrate 90, the transistor T12 may be arranged along the side 71*c*, and the multiple via conductors 712 may also be arranged along the transistor T12.

According to this, since the transistor T12 is arranged along the side 71*c*, the bump electrode 717 connected to the output (collector terminal) of the transistor T12 can be arranged near the side 71*c* of the integrated circuit 71. Therefore, it is possible to shorten the line length between the transistor T12 and the transformer X12, thereby suppressing the resistance loss due to wiring and/or mismatching loss due to the stray capacitance of the wiring. Furthermore, since the multiple via conductors 712 are arranged along the transistor T12, the heat generated by the transistor T12 can be efficiently conducted to the via conductors 712, improving the heat dissipation of the integrated circuit 71 even further.

For example, in the radio-frequency module 1 according to the present embodiment, the integrated circuit 71 may further include a bump electrode 715 arranged on the main surface 71*a* and connected to the main surface 90*a* of the module substrate 90. In a plan view of the module substrate 90, the bump electrode 715 may at least partially overlap the transistor T12 and may at least partially overlap the multiple via conductors 712.

According to this, since the bump electrode 715 overlaps the transistor T12, the heat generated by the transistor T12 can be efficiently conducted to the bump electrode 715. Additionally, since the bump electrode 715 overlaps the via conductors 712, the heat from the bump electrode 715 can be efficiently conducted to the via conductors 712. As a result, it is possible to further improve the heat dissipation of the integrated circuit 71.

Embodiment 2

Next, Embodiment 2 will be described. In the present embodiment, the shape of the metal member primarily differs from that of Embodiment 1 above. A radio-frequency module 1A according to the present embodiment will be described below, focusing on the differences from Embodiment 1 above with reference to the drawings.

The circuit configuration of the radio-frequency module 1A and the communication device including the same according to the present embodiment is the same as that of the radio-frequency module 1 and communication device 5 according to Embodiment 1; therefore, the illustration and description are omitted.

2.1 Implementation Example of Radio-Frequency Module 1A

Figure 8:
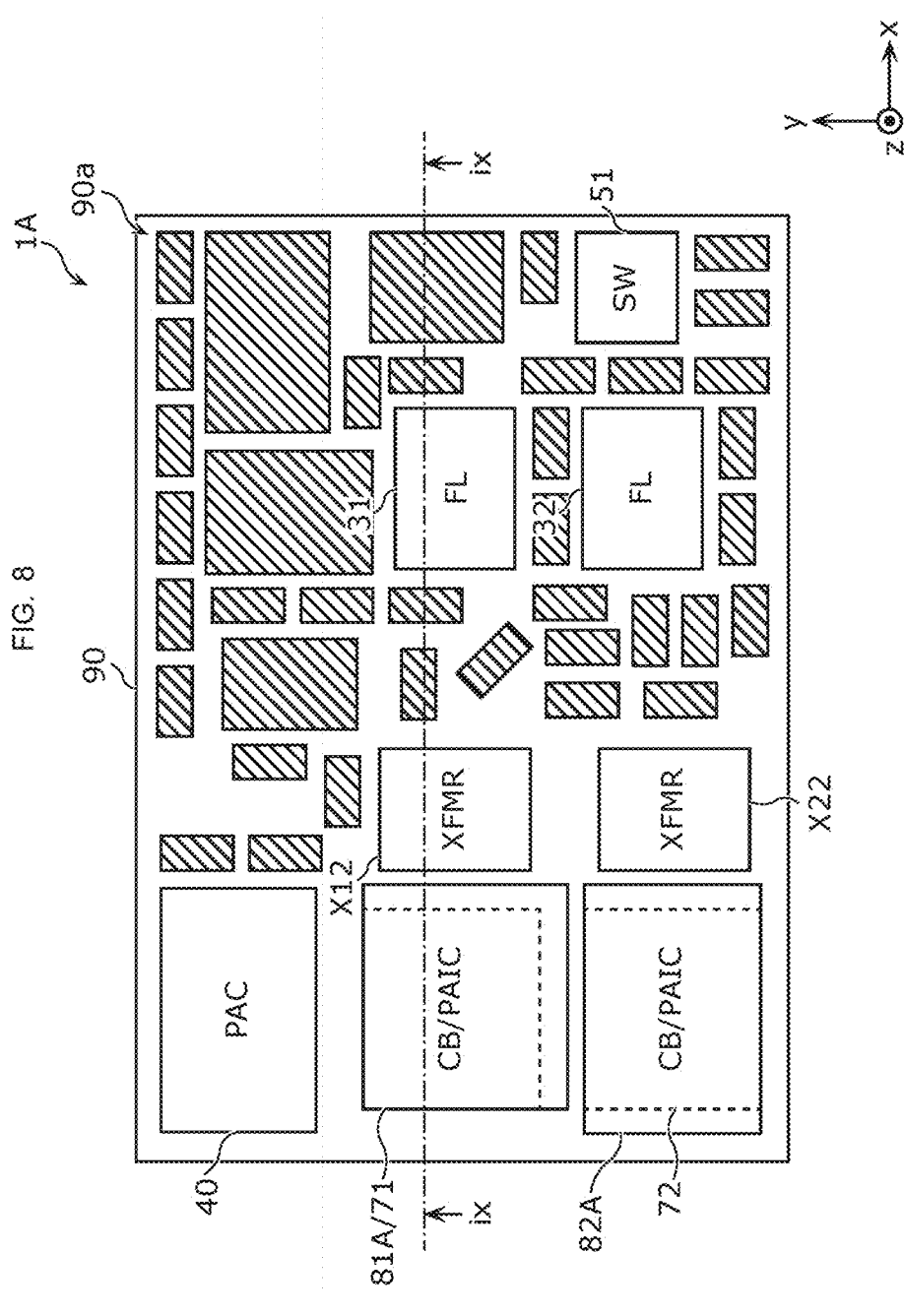
FIG. 8 is a plan view of a radio-frequency module according to Embodiment 2.
Figure 9:
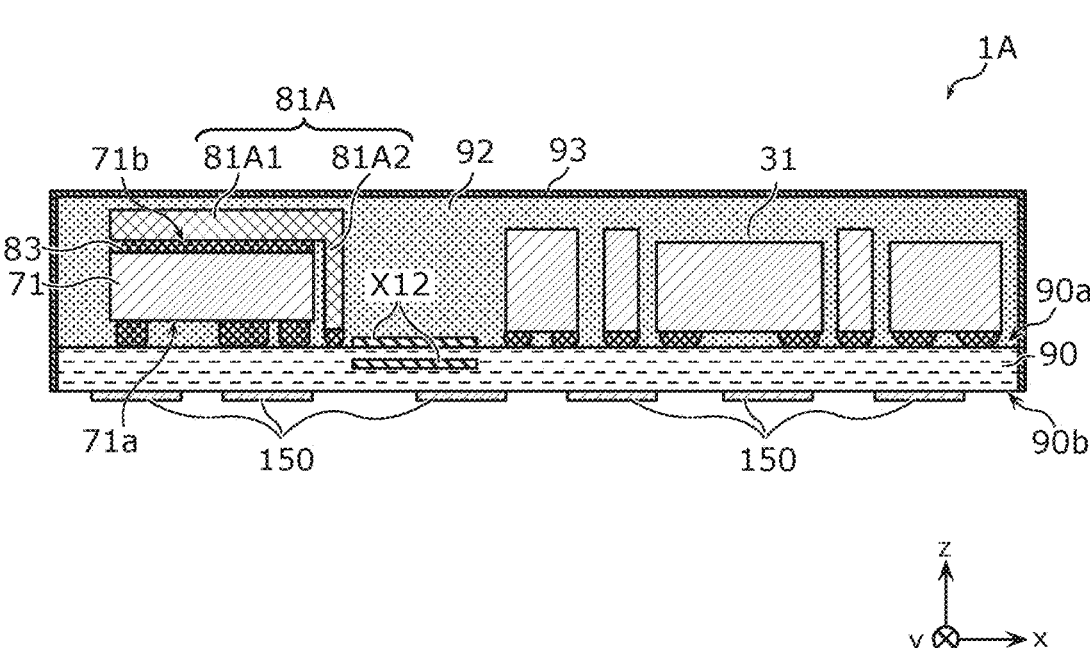
FIG. 9 is a cross-sectional view of the radio-frequency module according to Embodiment 2.

An implementation example of the radio-frequency module 1A according to the present embodiment will be described with reference to FIGS. 8 and 9. FIG. 8 is a plan view of the radio-frequency module 1A according to the present embodiment. FIG. 9 is a cross-sectional view of the radio-frequency module 1A according to the present embodiment. The cross-section of the radio-frequency module 1A in FIG. 9 corresponds to the cross-section along line ix-ix in FIG. 8.

Note that FIGS. 8 and 9 show an illustrative configuration of the radio-frequency module 1A, and the radio-frequency module 1A can be implemented using any of a variety of circuit implementations and circuit technologies. Therefore, the description of the radio-frequency module 1A provided below should not be interpreted in a limiting sense.

The radio-frequency module 1A, except for including metal members 81A and 82A in place of metal members 81 and 82, is similar to the radio-frequency module 1 according to Embodiment 1 above; therefore, the metal members 81A and 82A will be primarily explained below.

Each of the metal members 81A and 82A is an example of a first metal member, made of, for example, copper, gold, or brass. Specifically, the metal member 81A is arranged on the integrated circuit 71, and the metal member 82A is arranged on the integrated circuit 72. Note that since the metal member 82A is similar to the metal member 81A, its explanation will be omitted in the following.

The metal member 81A includes a top plate portion 81A1 and a sidewall portion 81A2.

The top plate portion 81A1 is an example of a first portion of the first metal member and covers at least a portion of the main surface 71*b* of the integrated circuit 71. That is, in a plan view of the module substrate 90, the top plate portion 81A1 at least partially overlaps the main surface 71*b* of the integrated circuit 71. Specifically, in a plan view of the module substrate 90, the top plate portion 81A1 at least partially overlaps each of the via conductors 711 to 713 in the integrated circuit 71 and at least partially overlaps each of the transistors T11 to T13 in the integrated circuit 71. Furthermore, in a plan view of the module substrate 90, the top plate portion 81A1 at least partially overlaps the shield layer 93. The upper surface of the top plate portion 81A1 is covered by the resin member 92, and the lower surface of the top plate portion 81A1 is bonded to the main surface 71*b* and the via conductors 711 to 713 with the solder layer 83 interposed therebetween (optional).

The sidewall portion 81A2 is an example of a second portion of the first metal member and extends from the main surface 90*a* of the module substrate 90 to the top plate portion 81A1, connecting the top plate portion 81A1 to the main surface 90*a*. Specifically, the lower portion of the sidewall portion 81A2 is connected to the main surface 90*a* of the module substrate 90 using a bonding material (such as solder), and the upper portion of the sidewall portion 81A2 is connected to the top plate portion 81A1. The sidewall portion 81A2 covers a portion of the side surface of the integrated circuit 71 without covering cover the entire periphery of the side surface of the integrated circuit 71. Specifically, the sidewall portion 81A2 covers the side surface on the positive side of the x-axis and the side surface on the negative side of the y-axis of the integrated circuit 71, but does not cover the side surface on the negative side of the x-axis and the side surface on the positive side of the y-axis. At this time, in a plan view of the module substrate 90, the sidewall portion 81A2 is arranged between the integrated circuit 71 and the filters 31 and 32, and between the integrated circuits 71 and 72.

Note that the shapes of the metal members 81A and 82A are not limited to the above shapes. For example, the sidewall portion 81A2 may have holes and may be formed in a strip shape. In this case, the sidewall portion 81A2 may cover the entire periphery of the side surface of the module substrate 90.

2.2 Effects and the Like

As described above, the radio-frequency module 1A according to the present embodiment includes: a module substrate 90 that includes main surfaces 90a and 90b that are opposite to each other; multiple external connection terminals 150 that are arranged on the main surface 90b of the module substrate 90; an integrated circuit 71 that is arranged on the main surface 90a of the module substrate 90 and includes a main surface 71a facing the main surface 90a and a main surface 71b opposite to the main surface 71a; a shield layer 93 that is arranged above the main surface 71b of the integrated circuit 71; and a metal member 81A that is arranged between the main surface 71b of the integrated circuit 71 and the shield layer 93. The integrated circuit 71 includes a transistor arranged on the main surface 71a and constituting a power amplifier 11 (such as the transistor T12) and at least one via conductor connecting the transistor to the metal member 81A (such as the via conductors 712). The metal member 81A at least partially overlaps the at least one via conductor and at least partially overlaps the shield layer 93 in a plan view of the module substrate 90.

According to this, the metal member 81A is arranged between the main surface 71b of the integrated circuit 71 and the shield layer 93, which are arranged above the main surface 90a of the module substrate 90. Therefore, the heat generated by the integrated circuit 71 can be dissipated from the main surface 71b of the integrated circuit 71 to the shield layer 93 via the metal member 81A, thus improving the heat dissipation of the integrated circuit 71. In particular, the metal member 81A at least partially overlaps each of the via conductors 712 and the shield layer 93 in a plan view of the module substrate 90. Therefore, it is possible to shorten the path for heat dissipation from the transistor T12 arranged on the main surface 71a through the via conductors 712, the metal member 81A, and the shield layer 93, and the effect of improving the heat dissipation of the integrated circuit 71 is significant.

For example, the radio-frequency module 1A according to the present embodiment may further include the solder layer 83 as a bonding layer for bonding the metal member 81A to the main surface 71b of the integrated circuit 71.

According to this, it is possible to reduce the thermal resistance between the metal member 81A and the main surface 71b of the integrated circuit 71, and further improve the heat dissipation of the integrated circuit 71.

For example, in the radio-frequency module 1A according to the present embodiment, the metal member 81A may include a top plate portion 81A1 that covers at least a portion of the main surface 71b of the integrated circuit 71, and a sidewall portion 81A2 that covers at least a portion of the side surface of the integrated circuit 71 and connects the top plate portion 81A1 to the main surface 90a of the module substrate 90.

According to this, since the top plate portion 81A1 of the metal member 81A is connected to the main surface 90a with the sidewall portion 81A2 interposed therebetween, it is possible to increase the heat dissipation path from the top plate portion 81A1, further improving the heat dissipation of the integrated circuit 71.

For example, the radio-frequency module 1A according to the present embodiment may further include circuit components arranged on the main surface 90a of the module substrate 90, and the sidewall portion 81A2 of the metal member 81A may be arranged between the integrated circuit 71 and the circuit components.

According to this, it is possible to improve the isolation between the integrated circuit 71 and the circuit components by the sidewall portion 81A2.

For example, in the radio-frequency module 1A according to the present embodiment, the circuit components may include the filter 31 and/or the filter 32.

According to this, it is possible to improve the isolation between the integrated circuit 71 and the filter 31 and/or the filter 32 by the sidewall portion 81A2.

For example, in the radio-frequency module 1A according to the present embodiment, the circuit components may include an integrated circuit 72 including transistors T21 to T23 that constitute the power amplifier 12.

According to this, it is possible to improve the isolation between the integrated circuit 71 and the integrated circuit 72 by the sidewall portion 81A2.

For example, in the radio-frequency module 1A according to the present embodiment, the sidewall portion 81A2 of the metal member 81A may cover only a portion of the side surface of the integrated circuit 71.

According to this, since the entire periphery of the side surface of the integrated circuit 71 is not covered by the metal member 81A, it becomes easier to fill the resin member 92 between the metal member 81A and the integrated circuit 71, contributing to the reduction of manufacturing costs and improvement of product quality.

For example, in the radio-frequency module 1A according to the present embodiment, the metal member 81A may be made of copper.

According to this, it is possible to use a material with high thermal conductivity for the metal member 81A, and enhance the heat dissipation of the integrated circuit 71. Furthermore, the grindability of the metal member 81A is improved, enhancing the degree of bonding with the shield layer 93, and reducing the thermal resistance between the metal member 81A and the shield layer 93. As a result, the heat dissipation of the integrated circuit 71 can be further improved.

For example, the radio-frequency module 1A according to the present embodiment may further include a resin member 92 that covers at least a portion of the main surface 90a of the module substrate 90 and at least a portion of the integrated circuit 71, and the shield layer 93 may cover at least a portion of the surface of the resin member 92.

According to this, it is possible to enhance the reliability, such as mechanical strength and moisture resistance, of the integrated circuit 71 and others on the main surface 90a.

Embodiment 3

Next, Embodiment 3 will be described. In the present embodiment, the shape of the metal member primarily differs from that of each Embodiment above. A radio-frequency module 1B according to the present embodiment will be described below, focusing on the differences from each Embodiment above with reference to the drawings.

The circuit configuration of the radio-frequency module 1B and the communication device including the same according to the present embodiment is the same as that of the radio-frequency module 1 and communication device 5 according to Embodiment 1; therefore, the illustration and description are omitted.

3.1 Implementation Example of Radio-Frequency Module 1B

Figure 10:
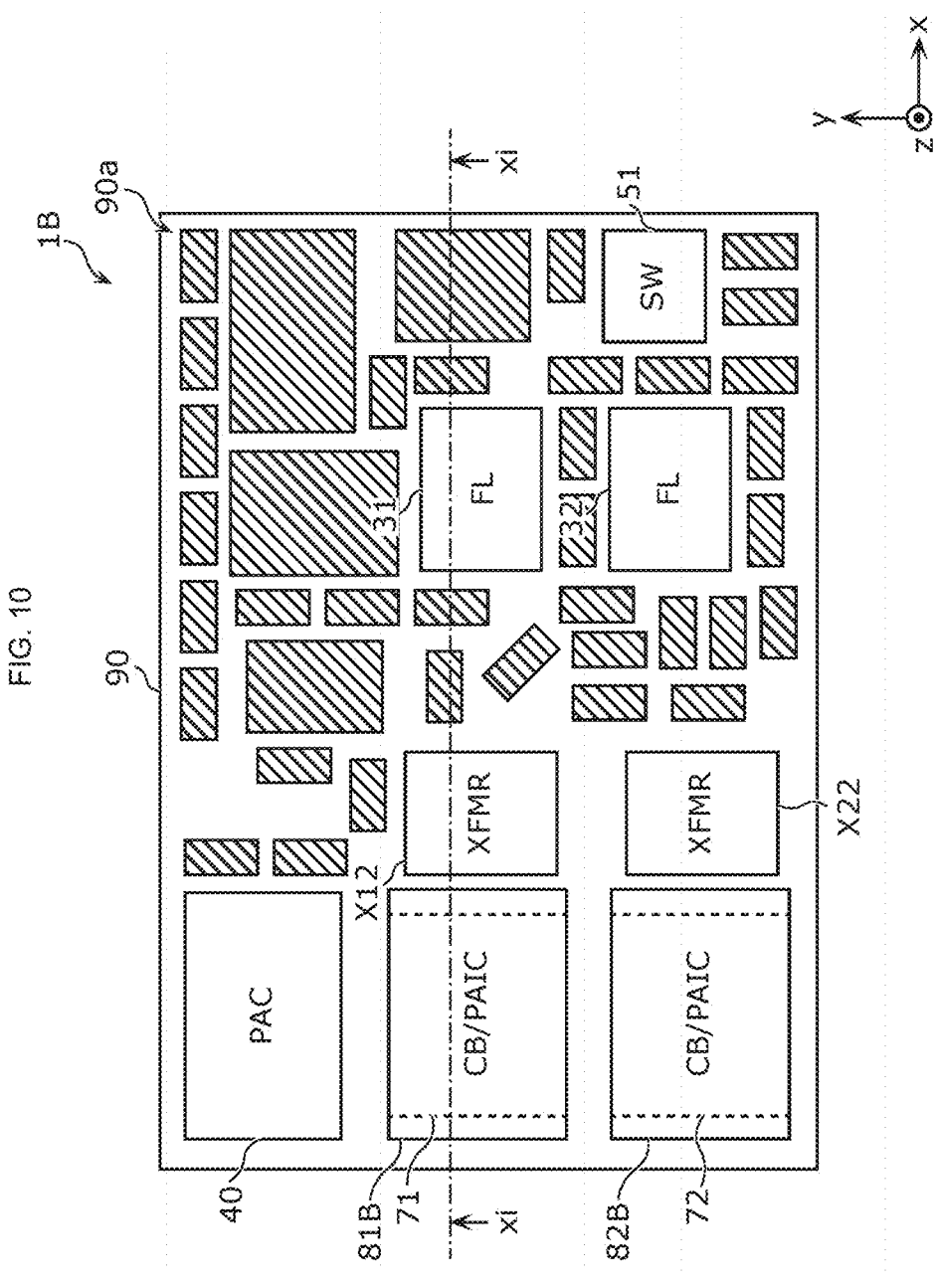
FIG. 10 is a plan view of a radio-frequency module according to Embodiment 3.
Figure 11:
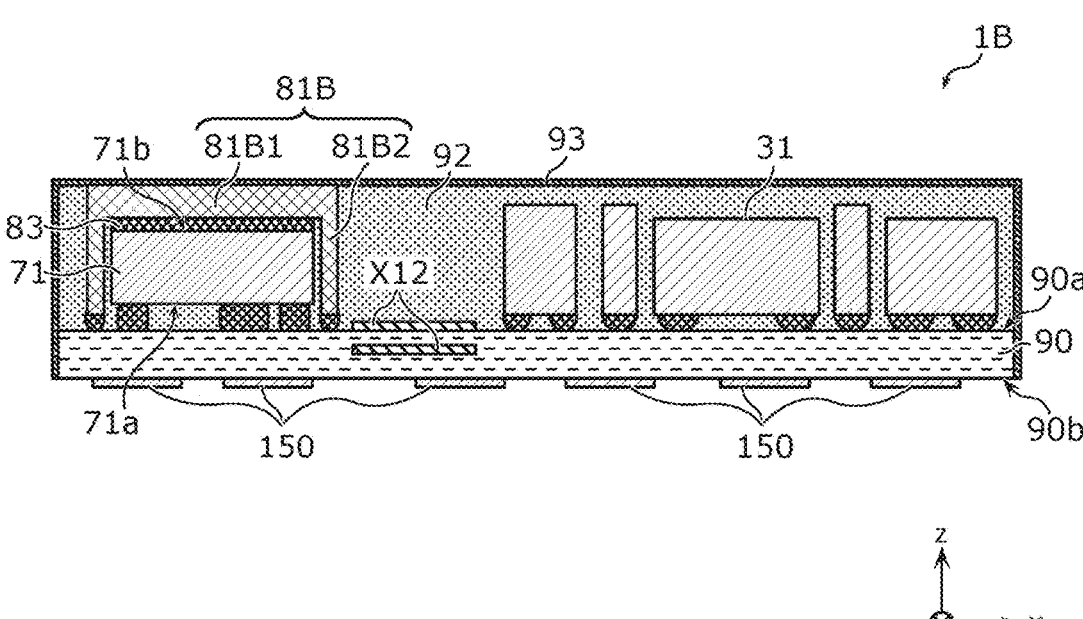
FIG. 11 is a cross-sectional view of the radio-frequency module according to Embodiment 3.

An implementation example of the radio-frequency module 1B according to the present embodiment will be described with reference to FIGS. 10 and 11. FIG. 10 is a plan view of the radio-frequency module 1B according to the present embodiment. FIG. 11 is a cross-sectional view of the radio-frequency module 1B according to the present embodiment. The cross-section of the radio-frequency module 1B in FIG. 11 corresponds to the cross-section along line xi-xi in FIG. 10.

Note that FIGS. 10 and 11 show an illustrative configuration of the radio-frequency module 1B, and the radio-frequency module 1B can be implemented using any of a variety of circuit implementations and circuit technologies. Therefore, the description of the radio-frequency module 1B provided below should not be interpreted in a limiting sense.

The radio-frequency module 1B, except for including metal members 81B and 82B in place of metal members 81 and 82 or metal members 81A and 82A, is similar to the radio-frequency module according to each Embodiment above; therefore, the metal members 81B and 82B will be primarily explained below.

Each of the metal members 81B and 82B is an example of a first metal member, made of, for example, copper, gold, or brass. The metal member 81B is arranged on the integrated circuit 71, and metal member 82B is arranged on the integrated circuit 72. Note that since the metal member 82B is similar to the metal member 81B, its explanation will be omitted in the following.

The metal member 81B includes a top plate portion 81B1 and a sidewall portion 81B2.

The top plate portion 81B1 is an example of a first portion of the first metal member and covers at least a portion of the main surface 71b of the integrated circuit 71. That is, in a plan view of the module substrate 90, the top plate portion 81B1 at least partially overlaps the main surface 71b of the integrated circuit 71. Specifically, in a plan view of the module substrate 90, the top plate portion 81B1 at least partially overlaps each of the via conductors 711 to 713 in the integrated circuit 71 and at least partially overlaps each of the transistors T11 to T13 in the integrated circuit 71. Furthermore, in a plan view of the module substrate 90, the top plate portion 81B1 at least partially overlaps the shield layer 93. The upper surface of the top plate portion 81B1 is covered by the shield layer 93 and bonded to the shield layer 93. The lower surface of the top plate portion 81B1 is bonded to the main surface 71b and the via conductors 711 to 713 with the solder layer 83 interposed therebetween (optional).

The sidewall portion 81B2 is an example of a second portion of the first metal member and extends from the main surface 90a of the module substrate 90 to the top plate portion 81B1. Specifically, the lower portion of the sidewall portion 81B2 is connected to the main surface 90a of the module substrate 90 using a bonding material (such as solder), and the upper portion of the sidewall portion 81B2 is connected to the top plate portion 81B1. The sidewall portion 81B2 does not cover the entire periphery of the side surface of the integrated circuit 71, but only a portion of the side surface of the integrated circuit 71. Specifically, the sidewall portion 81B2 covers the side surfaces on the positive and negative sides of the x-axis of the integrated circuit 71, but does not cover the side surfaces on the positive and negative sides of the y-axis. At this time, in a plan view of the module substrate 90, the sidewall portion 81B2 is arranged between the integrated circuit 71 and the filters 31 and 32.

Note that the shapes of the metal members 81B and 82B are not limited to the above shapes. For example, the sidewall portion 81B2 may have holes and may be formed in a strip shape. In this case, the sidewall portion 81B2 may cover the entire periphery of the side surface of the module substrate 90.

3.2 Effects and the Like

As described above, the radio-frequency module 1B according to the present embodiment includes: a module substrate 90 that includes main surfaces 90a and 90b that are opposite to each other; multiple external connection terminals 150 that are arranged on the main surface 90b of the module substrate 90; an integrated circuit 71 that is arranged on the main surface 90a of the module substrate 90 and includes a main surface 71a facing the main surface 90a and a main surface 71b opposite to the main surface 71a; a shield layer 93 that is arranged above the main surface 71b of the integrated circuit 71; and a metal member 81B that is arranged between the main surface 71b of the integrated circuit 71 and the shield layer 93. The integrated circuit 71 includes a transistor arranged on the main surface 71a and constituting a power amplifier 11 (such as the transistor T12) and at least one via conductor connecting the transistor to the metal member 81B (such as the via conductors 712). The metal member 81B at least partially overlaps the at least one via conductor and at least partially overlaps the shield layer 93 in a plan view of the module substrate 90.

According to this, the metal member 81B is arranged between the main surface 71b of the integrated circuit 71 and the shield layer 93, which are arranged above the main surface 90a of the module substrate 90. Therefore, the heat generated by the integrated circuit 71 can be dissipated from the main surface 71b of the integrated circuit 71 to the shield layer 93 via the metal member 81B, thus improving the heat dissipation of the integrated circuit 71. In particular, the metal member 81B at least partially overlaps each of the via conductors 712 and the shield layer 93 in a plan view of the module substrate 90. Therefore, it is possible to shorten the path for heat dissipation from the transistor T12 arranged on the main surface 71a through the via conductors 712, the metal member 81B, and the shield layer 93, and the effect of improving the heat dissipation of the integrated circuit 71 is significant.

For example, the radio-frequency module 1B according to the present embodiment may further include the solder layer 83 as a bonding layer for bonding the metal member 81B to the main surface 71b of the integrated circuit 71.

According to this, it is possible to reduce the thermal resistance between the metal member 81B and the main surface 71b of the integrated circuit 71, and further improve the heat dissipation of the integrated circuit 71.

For example, in the radio-frequency module 1B according to the present embodiment, the metal member 81B may be bonded to the shield layer 93.

According to this, it is possible to reduce the thermal resistance between the metal member 81B and the shield layer 93, and further improve the heat dissipation of the integrated circuit 71.

For example, in the radio-frequency module 1B according to the present embodiment, the metal member 81B may include a top plate portion 81B1 that covers at least a portion of the main surface 71b of the integrated circuit 71, and a sidewall portion 81B2 that covers at least a portion of the side surface of the integrated circuit 71 and connects the top plate portion 81B1 to the main surface 90a of the module substrate 90.

According to this, since the top plate portion 81B1 of the metal member 81B is connected to the main surface 90a with the sidewall portion 81B2 interposed therebetween, it is possible to increase the heat dissipation path from the top plate portion 81B1, further improving the heat dissipation of the integrated circuit 71.

For example, the radio-frequency module 1B according to the present embodiment may further include circuit components arranged on the main surface 90a of the module substrate 90, and the sidewall portion 81B2 of the metal member 81B may be arranged between the integrated circuit 71 and the circuit components in a plan view of the module substrate 90.

According to this, it is possible to improve the isolation between the integrated circuit 71 and the circuit components by the sidewall portion 81B2.

For example, in the radio-frequency module 1B according to the present embodiment, the circuit components may include the filter 31 and/or the filter 32.

According to this, it is possible to improve the isolation between the integrated circuit 71 and the filter 31 and/or the filter 32 by the sidewall portion 81B2.

For example, in the radio-frequency module 1B according to the present embodiment, the sidewall portion 81B2 of the metal member 81B may cover only a portion of the side surface of the integrated circuit 71.

According to this, since the entire periphery of the side surface of the integrated circuit 71 is not covered by the metal member 81B, it becomes easier to fill the resin member 92 between the metal member 81B and the integrated circuit 71, contributing to the improvement of product quality.

For example, in the radio-frequency module 1B according to the present embodiment, the metal member 81B may be made of copper.

According to this, it is possible to use a material with high thermal conductivity for the metal member 81B, and enhance the heat dissipation of the integrated circuit 71. Furthermore, the grindability of the metal member 81B is improved, enhancing the degree of bonding with the shield layer 93, and reducing the thermal resistance between the metal member 81B and the shield layer 93. As a result, the heat dissipation of the integrated circuit 71 can be further improved.

For example, the radio-frequency module 1B according to the present embodiment may further include a resin member 92 that covers at least a portion of the main surface 90a of the module substrate 90 and at least a portion of the integrated circuit 71, and the shield layer 93 may cover at least a portion of the surface of the resin member 92.

According to this, it is possible to enhance the reliability, such as mechanical strength and moisture resistance, of the integrated circuit 71 and others on the main surface 90a.

Embodiment 4

Next, Embodiment 4 will be described. In the present embodiment, the shape of the metal member primarily differs from that of each Embodiment above. A radio-frequency module 1C according to the present embodiment will be described below, focusing on the differences from each Embodiment above with reference to the drawings.

The circuit configuration of the radio-frequency module 1C and the communication device including the same according to the present embodiment is the same as that of the radio-frequency module 1 and communication device 5 according to Embodiment 1; therefore, the illustration and description are omitted.

4.1 Implementation Example of Radio-Frequency Module 1C

Figure 12:
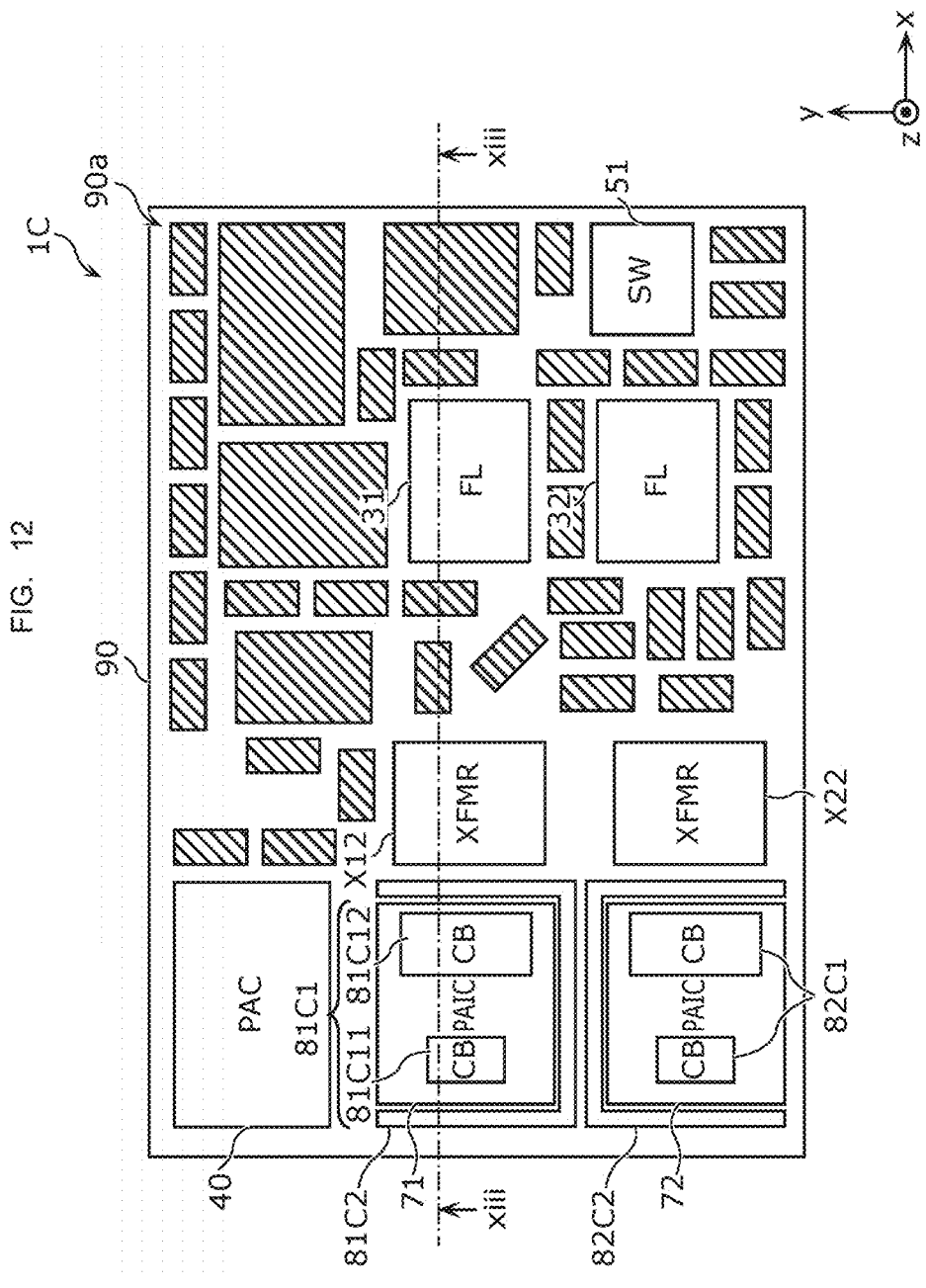
FIG. 12 is a plan view of a radio-frequency module according to Embodiment 4.
Figure 13:
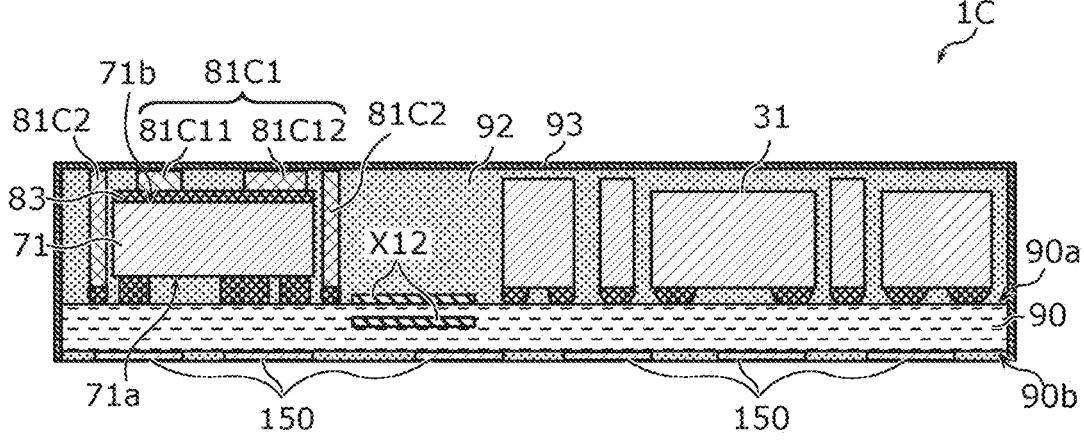
FIG. 13 is a cross-sectional view of the radio-frequency module according to Embodiment 4.

An implementation example of the radio-frequency module 1C according to the present embodiment will be described with reference to FIGS. 12 and 13. FIG. 12 is a plan view of the radio-frequency module 1C according to the present embodiment. FIG. 13 is a cross-sectional view of the radio-frequency module 1C according to the present embodiment. The cross-section of the radio-frequency module 1C in FIG. 13 corresponds to the cross-section along line xiii-xiii in FIG. 12.

Note that FIGS. 12 and 13 show an illustrative configuration of the radio-frequency module 1C, and the radio-frequency module 1C can be implemented using any of a variety of circuit implementations and circuit technologies. Therefore, the description of the radio-frequency module 1C provided below should not be interpreted in a limiting sense.

The radio-frequency module 1C, except for including metal members 81C1, 81C2, 82C1, and 82C2 in place of metal members 81 and 82, metal members 81A and 82A, or metal members 81B and 82B, is similar to the radio-frequency module according to each Embodiment above; therefore, the metal members 81C1, 81C2, 82C1, and 82C2 will be primarily explained below.

Each of the metal members 81C1 and 82C1 is an example of a first metal member, made of, for example, copper, gold, or brass. The metal member 81C1 is arranged on the integrated circuit 71, and metal member 82C1 is arranged on the integrated circuit 72. Note that since the metal member 82C1 is similar to the metal member 81C1, its explanation will be omitted in the following.

The metal member 81C1 partially covers the main surface 71b of the integrated circuit 71. That is, the metal member 81C1 partially overlaps the main surface 71b of the integrated circuit 71 in a plan view of the module substrate 90. As shown in FIG. 12, the metal member 81C1 includes two metal members 81C11 and 81C12.

In a plan view of the module substrate 90, the metal member 81C11 at least partially overlaps the via conductors 711 in the integrated circuit 71 and at least partially overlaps the transistor T11 in the integrated circuit 71. Furthermore, in a plan view of the module substrate 90, the metal member 81C11 at least partially overlaps the shield layer 93. The upper surface of the metal member 81C11 is covered by the shield layer 93 and bonded to the shield layer 93. The lower surface of the metal member 81C11 is bonded to the main surface 71b and the via conductors 711 to 713 with the solder layer 83 interposed therebetween (optional).

In a plan view of the module substrate 90, the metal member 81C12 at least partially overlaps each of the via conductors 712 and 713 in the integrated circuit 71 and at least partially overlaps each of the transistors T12 and T13 in the integrated circuit 71. Furthermore, in a plan view of the module substrate 90, the metal member 81C12 at least partially overlaps the shield layer 93. The upper surface of the metal member 81C12 is covered by the shield layer 93 and bonded to the shield layer 93. The lower surface of the metal member 81C12 is bonded to the main surface 71*b* and the via conductors 711 to 713 with the solder layer 83 interposed therebetween (optional).

Each of the metal members 81C2 and 82C2 is an example of a second metal member, made of, for example, copper, gold, or brass. The metal members 81C2 and 82C2 are arranged on the main surface 90*a* of the module substrate 90 adjacent to the integrated circuits 71 and 72, respectively, and extend from main surface 90*a* of the module substrate 90 to the shield layer 93. The lower end surface of each of the metal members 81C2 and 82C2 is connected to the main surface 90*a* of the module substrate 90 using a bonding material (such as solder), and the upper end surface of the metal member 81C2 is bonded to the shield layer 93.

The metal member 81C2 does not cover the entire periphery of the side surface of the integrated circuit 71, but only a portion of the side surface of the integrated circuit 71. Specifically, the metal member 81C2 covers the side surfaces on the positive and negative sides of the x-axis and the side surface on the negative side of the y-axis of the integrated circuit 71, but does not cover the side surface on the positive side of the y-axis. At this time, in a plan view of the module substrate 90, the metal member 81C2 is arranged between the integrated circuit 71 and the filters 31 and 32, and between the integrated circuits 71 and 72.

The metal member 82C2 does not cover the entire periphery of the side surface of the integrated circuit 72, but only a portion of the side surface of the integrated circuit 72. Specifically, the metal member 82C2 covers the side surfaces on the positive and negative sides of the x-axis and the side surface on the positive side of the y-axis of the integrated circuit 72, but does not cover the side surface on the negative side of the y-axis. At this time, in a plan view of the module substrate 90, the metal member 82C2 is arranged between the integrated circuit 72 and the filters 31 and 32, and between the integrated circuits 71 and 72.

Note that the shapes of the metal members 81C1, 81C2, 82C1, and 82C2 are not limited to the above shapes. For example, the metal member 81C1 may be a single metal member formed by combining the metal members 81C11 and 81C12 into a single unit. In addition, the metal member 81C2 may have holes and may be formed in a strip shape. In this case, the metal member 81C2 may cover the entire periphery of the side surface of the module substrate 90.

4.2 Method of Manufacturing Radio-Frequency Module 1C

Next, a method for manufacturing the radio-frequency module 1C, as described above, will be explained with reference to FIGS. 14A to 14E. FIGS. 14A to 14E are illustrations showing first to fifth steps of the method for manufacturing the radio-frequency module 1C, according to the present embodiment.

Figure 14A:
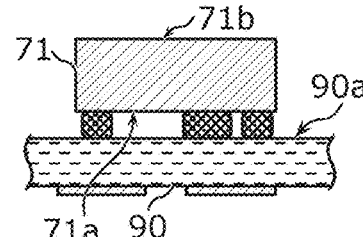
FIG. 14A is an illustration showing a first step of a method of manufacturing the radio-frequency module according to Embodiment 4.
Figure 14B:
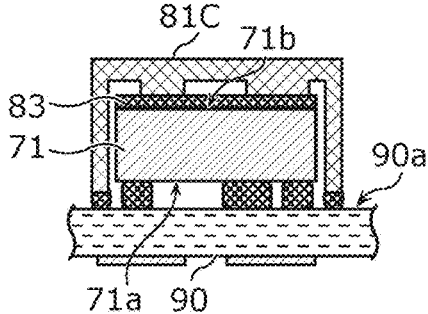
FIG. 14B is an illustration showing a second step of the method of manufacturing the radio-frequency module according to Embodiment 4.
Figure 14C:
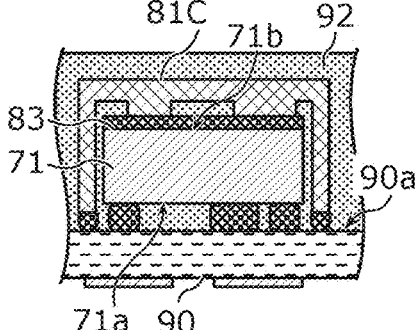
FIG. 14C is an illustration showing a third step of the method of manufacturing the radio-frequency module according to Embodiment 4.

Firstly, in the first step, as shown in FIG. 14A, the integrated circuit 71 and the like are mounted on the main surface 90*a* of the module substrate 90. Then, in the second step, as shown in FIG. 14B, solder is transferred onto the integrated circuit 71, and the metal member 81C is arranged on the solder layer 83. At this time, the metal member 81C is an integrated entity of the metal members 81C1 and 81C2. After that, reflow and cleaning are performed. Next, in the third step, as shown in FIG. 14C, the resin member 92 is deposited onto the main surface 90*a* of the module substrate 90. At this time, the resin member 92 is also deposited between the integrated circuit 71 and the metal member 81C.

Figure 14D:
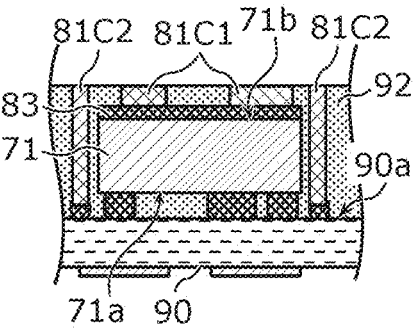
FIG. 14D is an illustration showing a fourth step of the method of manufacturing the radio-frequency module according to Embodiment 4.
Figure 14E:
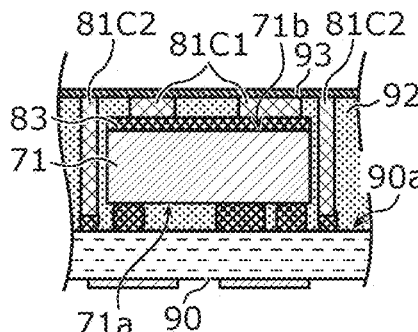
FIG. 14E is an illustration showing a fifth step of the method of manufacturing the radio-frequency module according to Embodiment 4.

Then, in the fourth step, as shown in FIG. 14D, the resin member 92 and the metal member 81C are ground to form metal members 81C1 and 81C2. At this time, the end surfaces of the metal members 81C1 and 81C2 are exposed from the resin member 92. Lastly, in the fifth step, as shown in FIG. 14E, the shield layer 93 is formed on the surface of the metal members 81C1 and 81C2 and the resin member 92 by the sputtering method.

4.3 Effects and the Like

As described above, the radio-frequency module 1C according to the present embodiment includes: a module substrate 90 that includes main surfaces 90*a* and 90*b* that are opposite to each other; multiple external connection terminals 150 that are arranged on the main surface 90*b* of the module substrate 90; an integrated circuit 71 that is arranged on the main surface 90*a* of the module substrate 90 and includes a main surface 71*a* facing the main surface 90*a* and a main surface 71*b* opposite to the main surface 71*a*; a shield layer 93 that is arranged above the main surface 71*b* of the integrated circuit 71; and a metal member 81C1 that is arranged between the main surface 71*b* of the integrated circuit 71 and the shield layer 93. The integrated circuit 71 includes a transistor arranged on the main surface 71*a* and constituting a power amplifier 11 (such as the transistor T12) and at least one via conductor connecting the transistor to the metal member 81C1 (such as the via conductors 712). The metal member 81C1 at least partially overlaps the at least one via conductor and at least partially overlaps the shield layer 93 in a plan view of the module substrate 90.

According to this, the metal member 81C1 is arranged between the main surface 71*b* of the integrated circuit 71 and the shield layer 93, which are arranged above the main surface 90*a* of the module substrate 90. Therefore, the heat generated by the integrated circuit 71 can be dissipated from the main surface 71*b* of the integrated circuit 71 to the shield layer 93 via the metal member 81C1, thus improving the heat dissipation of the integrated circuit 71. In particular, the metal member 81C1 at least partially overlaps each of the via conductors 712 and the shield layer 93 in a plan view of the module substrate 90. Therefore, it is possible to shorten the path for heat dissipation from the transistor T12 arranged on the main surface 71*a* through the via conductors 712, the metal member 81C1, and the shield layer 93, and the effect of improving the heat dissipation of the integrated circuit 71 is significant.

For example, the radio-frequency module 1C according to the present embodiment may further include the solder layer 83 as a bonding layer for bonding the metal member 81C1 to the main surface 71*b* of the integrated circuit 71.

According to this, it is possible to reduce the thermal resistance between the metal member 81C1 and the main surface 71*b* of the integrated circuit 71, and further improve the heat dissipation of the integrated circuit 71.

For example, in the radio-frequency module 1C according to the present embodiment, the metal member 81C1 may be bonded to the shield layer 93.

According to this, it is possible to reduce the thermal resistance between the metal member 81C1 and the shield layer 93, and further improve the heat dissipation of the integrated circuit 71.

For example, the radio-frequency module 1C according to the present embodiment may further include a metal member 81C2 that is arranged adjacent to the integrated circuit 71 on the main surface 90*a* of the module substrate 90 and extends from the main surface 90*a* of the module substrate 90 to the shield layer 93.

According to this, since the shield layer 93 is connected to the main surface 90*a* with the metal member 81C2 interposed therebetween, it is possible to increase the heat dissipation path from the shield layer 93, further improving the heat dissipation of the integrated circuit 71.

For example, the radio-frequency module 1C according to the present embodiment may further include circuit components arranged on the main surface 90*a* of the module substrate 90, and the metal member 81C2 may be arranged between the integrated circuit 71 and the circuit components.

According to this, it is possible to improve the isolation between the integrated circuit 71 and the circuit components by the metal member 81C2.

For example, in the radio-frequency module 1C according to the present embodiment, the circuit components may include the filter 31 and/or the filter 32.

According to this, it is possible to improve the isolation between the integrated circuit 71 and the filter 31 and/or the filter 32 by the metal member 81C2.

For example, in the radio-frequency module 1C according to the present embodiment, the circuit components may include an integrated circuit 72 including transistors T21 to T23 that constitute the power amplifier 12.

According to this, it is possible to improve the isolation between the integrated circuit 71 and the integrated circuit 72 by the metal member 81C2.

For example, in the radio-frequency module 1C according to the present embodiment, the metal members 81C1 and 81C2 may be made of copper.

According to this, it is possible to use a material with high thermal conductivity for the metal members 81C1 and 81C2, and enhance the heat dissipation of the integrated circuit 71. Furthermore, the grindability of the metal members 81C1 and 81C2 is improved, enhancing the degree of bonding with the shield layer 93, and reducing the thermal resistance between the metal member 81C1 and the shield layer 93. As a result, the heat dissipation of the integrated circuit 71 can be further improved.

For example, in the radio-frequency module 1C according to the present embodiment, the metal member 81C1 may cover only a portion of the main surface 71*b* of the integrated circuit 71.

According to this, since the entire main surface 71*b* of the integrated circuit 71 may not be covered by the metal member 81C1, it becomes easier to bond the metal member 81C1 to the integrated circuit 71, contributing to the improvement of product quality.

For example, the radio-frequency module 1C according to the present embodiment may further include a resin member 92 that covers at least a portion of the main surface 90*a* of the module substrate 90 and at least a portion of the integrated circuit 71, and the shield layer 93 may cover at least a portion of the surface of the resin member 92.

According to this, it is possible to enhance the reliability, such as mechanical strength and moisture resistance, of the integrated circuit 71 and others on the main surface 90*a*.

OTHER EMBODIMENTS

The radio-frequency module according to the present disclosure has been described above based on embodiments, but the radio-frequency module according to the present disclosure is not limited to these embodiments. Other embodiments that are implemented by any combination of the constitutional elements in the aforementioned embodiments, modified examples that are obtained by making various modifications that can be conceived by those skilled in the art without departing from the spirit of the present disclosure to the aforementioned embodiments, and various devices incorporating the aforementioned radio-frequency modules are also included in the present disclosure.

For example, in the circuit configuration of the radio-frequency module according to each of the above embodiments, additional circuit elements, wiring lines, and the like may be inserted between the paths connecting the circuit elements and signal paths disclosed in the drawings. For example, an impedance matching circuit may be inserted between the power amplifier and the filter.

The features of the radio-frequency modules described based on the aforementioned embodiments are indicated below.

<1> A radio-frequency module including:

a module substrate that includes a first main surface and a second main surface that are opposite to each other;

multiple external connection terminals that are arranged on the second main surface of the module substrate;

a first integrated circuit that is arranged on the first main surface of the module substrate and includes a third main surface facing the first main surface and a fourth main surface opposite to the third main surface;

a shield layer that is arranged above the fourth main surface of the first integrated circuit; and a first metal member that is arranged between the fourth main surface of the first integrated circuit and the shield layer, in which the first integrated circuit includes a first transistor arranged on the third main surface and constituting a first power amplifier and at least one via conductor connecting the first transistor to the first metal member, and the first metal member at least partially overlaps the at least one via conductor and at least partially overlaps the shield layer in a plan view of the module substrate.

<2> The radio-frequency module according to <1>, further including:

a bonding layer that bonds the first metal member to the fourth main surface of the first integrated circuit.

<3> The radio-frequency module according to <1> or <2>, in which the first metal member is bonded to the shield layer.

<4> The radio-frequency module according to any one of <1> to <3>, in which the first metal member includes a first portion that covers at least a portion of the fourth main surface of the first integrated circuit, and a second portion that covers at least a portion of a side surface of the first integrated circuit and connects the first portion to the first main surface of the module substrate.

<5> The radio-frequency module according to <4>, further including:

a circuit component that is arranged on the first main surface of the module substrate, in which the second portion of the first metal member is arranged between the first integrated circuit and the circuit component.

<6> The radio-frequency module according to <5>, in which the circuit component includes a filter.

<7> The radio-frequency module according to <5> or <6>, in which the circuit component includes a second integrated circuit that includes a second transistor constituting a second power amplifier.

<8> The radio-frequency module according to any one of <4> to <7>, in which the second portion of the first metal member covers only a portion of the side surface of the first integrated circuit.

<9> The radio-frequency module according to any one of <1> to <8>, in which the first metal member is made of copper.

<10> The radio-frequency module according to any one of <1> to <3>, further including:

a second metal member that is arranged adjacent to the first integrated circuit on the first main surface of the module substrate and extends from the first main surface of the module substrate to the shield layer.

<11> The radio-frequency module according to <10>, further including:

a circuit component that is arranged on the first main surface of the module substrate, in which the second metal member is arranged between the first integrated circuit and the circuit component.

<12> The radio-frequency module according to <11>, in which the circuit component includes a filter.

<13> The radio-frequency module according to <11> or <12>, in which the circuit component includes a second integrated circuit that includes a second transistor constituting a second power amplifier.

<14> The radio-frequency module according to any one of <10> to <13>, in which the first metal member and the second metal member are made of copper.

<15> The radio-frequency module according to any one of <1> to <14>, in which the first metal member covers only a portion of the fourth main surface of the first integrated circuit.

<16> The radio-frequency module according to any one of <1> to <15>, further including:

a resin member that covers at least a portion of the first main surface of the module substrate and at least a portion of the first integrated circuit, in which the shield layer covers at least a portion of a surface of the resin member.

<17> The radio-frequency module according to any one of <1> to <16>, in which the first integrated circuit includes a first side in a plan view of the module substrate, the first transistor is arranged along the first side, and the at least one via conductor includes a plurality of via conductors arranged along the first transistor.

<18> The radio-frequency module according to <17>, in which the first integrated circuit further includes a bump electrode that is arranged on the third main surface and connected to the first main surface of the module substrate, and the bump electrode at least partially overlaps the first transistor and at least partially overlaps the plurality of via conductors in a plan view of the module substrate.

The present disclosure can be widely used in communication equipment such as mobile phones as a radio-frequency module arranged in the front end section.

What is claimed is:

1. A radio-frequency module comprising:

a module substrate that includes a first main surface and a second main surface that are opposite to each other;

multiple external connection terminals that are arranged on the second main surface of the module substrate;

a first integrated circuit that is arranged on the first main surface of the module substrate and includes a third main surface facing the first main surface and a fourth main surface opposite to the third main surface;

a shield layer that is arranged above the fourth main surface of the first integrated circuit; and a first metal member that is arranged between the fourth main surface of the first integrated circuit and the shield layer, wherein the first integrated circuit includes a first transistor arranged on the third main surface and constituting a first power amplifier and at least one via conductor connecting the first transistor to the first metal member, and the first metal member at least partially overlaps the at least one via conductor and at least partially overlaps the shield layer in a plan view of the module substrate.

2. The radio-frequency module according to claim 1, further comprising:

a bonding layer that bonds the first metal member to the fourth main surface of the first integrated circuit.

3. The radio-frequency module according to claim 2, wherein the first metal member is bonded to the shield layer.

4. The radio-frequency module according to claim 2, wherein the first metal member includes a first portion that covers at least a portion of the fourth main surface of the first integrated circuit, and a second portion that covers at least a portion of a side surface of the first integrated circuit and connects the first portion to the first main surface of the module substrate.

5. The radio-frequency module according to claim 4, further comprising:

a circuit component that is arranged on the first main surface of the module substrate, wherein the second portion of the first metal member is arranged between the first integrated circuit and the circuit component.

6. The radio-frequency module according to claim 5, wherein the circuit component includes a filter.

7. The radio-frequency module according to claim 5, wherein the circuit component includes a second integrated circuit that includes a second transistor constituting a second power amplifier.

8. The radio-frequency module according to claim 4, wherein the second portion of the first metal member covers only a portion of the side surface of the first integrated circuit.

9. The radio-frequency module according to claim 2, wherein the first metal member is made of copper.

10. The radio-frequency module according to claim 2, further comprising:

a second metal member that is arranged adjacent to the first integrated circuit on the first main surface of the module substrate and extends from the first main surface of the module substrate to the shield layer.

11. The radio-frequency module according to claim 10, further comprising:

a circuit component that is arranged on the first main surface of the module substrate, wherein the second metal member is arranged between the first integrated circuit and the circuit component.

12. The radio-frequency module according to claim 11, wherein the circuit component includes a filter.

13. The radio-frequency module according to claim 11, wherein the circuit component includes a second integrated circuit that includes a second transistor constituting a second power amplifier.

14. The radio-frequency module according to claim 10, wherein the first metal member and the second metal member are made of copper.

15. The radio-frequency module according to claim 2, wherein the first metal member covers only a portion of the fourth main surface of the first integrated circuit.

16. The radio-frequency module according to claim 2, further comprising:

a resin member that covers at least a portion of the first main surface of the module substrate and at least a portion of the first integrated circuit, wherein the shield layer covers at least a portion of a surface of the resin member.

17. The radio-frequency module according to claim 2, wherein the first integrated circuit includes a first side in a plan view of the module substrate, the first transistor is arranged along the first side, and the at least one via conductor includes a plurality of via conductors arranged along the first transistor.

18. The radio-frequency module according to claim 17, wherein the first integrated circuit further includes a bump electrode that is arranged on the third main surface and connected to the first main surface of the module substrate, and the bump electrode at least partially overlaps the first transistor and at least partially overlaps the plurality of via conductors in a plan view of the module substrate.

19. The radio-frequency module according to claim 1, wherein the first metal member includes a first portion that covers at least a portion of the fourth main surface of the first integrated circuit, and a second portion that covers at least a portion of a side surface of the first integrated circuit and connects the first portion to the first main surface of the module substrate.

20. The radio-frequency module according to claim 1, further comprising:

a second metal member that is arranged adjacent to the first integrated circuit on the first main surface of the module substrate and extends from the first main surface of the module substrate to the shield layer.

* * * * *